(12) United States Patent
Muramatsu

(10) Patent No.: US 9,430,197 B2
(45) Date of Patent: Aug. 30, 2016

(54) COMPILER, COMPILE METHOD AND COMPILE APPARATUS

(71) Applicant: FUJITSU LIMITED, Kawasaki-shi, Kanagawa (JP)

(72) Inventor: Yuichi Muramatsu, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/636,609

(22) Filed: Mar. 3, 2015

(65) Prior Publication Data

US 2015/0277864 A1 Oct. 1, 2015

(30) Foreign Application Priority Data

Mar. 31, 2014 (JP) .................. 2014-072012

(51) Int. Cl.
*G06F 9/45* (2006.01)
*G06F 9/44* (2006.01)

(52) U.S. Cl.
CPC ............... *G06F 8/41* (2013.01); *G06F 9/4448* (2013.01)

(58) Field of Classification Search
CPC ................................ G06F 9/4448; G06F 8/41
USPC ........................................................ 717/140
See application file for complete search history.

(56) References Cited

U.S. PATENT DOCUMENTS

| 6,434,625 | B1 * | 8/2002 | Loen | H04L 29/06 709/236 |
| 9,256,546 | B2 * | 2/2016 | Gschwind | G06F 12/10 |
| 2003/0030830 | A1 | 2/2003 | Yamamura | |
| 2003/0236986 | A1 * | 12/2003 | Cronce | G06F 21/14 713/189 |
| 2005/0262042 | A1 | 11/2005 | Kondo | |
| 2008/0320454 | A1 * | 12/2008 | Suzuki | G06F 8/423 717/143 |
| 2009/0217251 | A1 * | 8/2009 | Connolly | G06F 11/263 717/140 |
| 2011/0072413 | A1 * | 3/2011 | Meijer | G06F 8/41 717/106 |
| 2013/0290928 | A1 * | 10/2013 | Johnson | G06F 9/44 717/109 |

FOREIGN PATENT DOCUMENTS

| JP | 2003-44472 | 2/2003 |
| JP | 2005-332146 | 12/2005 |

* cited by examiner

*Primary Examiner* — John Chavis
(74) *Attorney, Agent, or Firm* — Staas & Halsey LLP

(57) ABSTRACT

A compiler includes: a memory; and a processor coupled to the memory and configured to execute a compilation process, the compilation process includes: reading a source code to be compiled and literal tuples each of which is a combination of a plurality of string literals having meanings that correspond to each other between a plurality of languages, and generating a code in which regarding each literal tuple, a calculation byte length which is greater than or equal to a longest byte length of the string literal among the literal tuple is allocated to each of the plurality of string literals that belong to the literal tuple and a start address of each string literal is referenced according to a locale designated at an execution time.

21 Claims, 16 Drawing Sheets

FIG.9

| ID | RECORD LENGTH | CATEGORY | LENGTH | OFFSET | VALUE |
|---|---|---|---|---|---|
| A00001 | 22 | 1 | 8 | 0 | 20131226 |
| A00002 | 18 | 2 | 4 | 8 | B8-2 |
| ⋮ | ⋮ | ⋮ | ⋮ | ⋮ | ⋮ |

609

| ID | RECORD LENGTH | CATEGORY | VALUE |
|---|---|---|---|
| B00001 | 20 | 3 | 富士通太郎 |
| B00002 | 16 | 3 | 基本給 |
| B00003 | 16 | 3 | 職責給 |
| B00004 | 18 | 3 | 勤続年数 |
| ⋮ | ⋮ | ⋮ | ⋮ |

610

| ID | RECORD LENGTH | CATEGORY | VALUE |
|---|---|---|---|
| C00001 | 22 | 3 | Fujitsu Taro |
| C00002 | 21 | 3 | Base Salary |
| C00003 | 31 | 3 | Responsibility Salary |
| C00004 | 27 | 3 | Length of Service |
| ⋮ | ⋮ | ⋮ | ⋮ |

611

| ID | RECORD LENGTH | CATEGORY | VALUE |
|---|---|---|---|
| D00001 | 20 | 3 | 富士通太郎 |
| D00002 | 18 | 3 | 基本工资 |
| D00003 | 18 | 3 | 职务工资 |
| D00004 | 14 | 3 | 工龄 |
| ⋮ | ⋮ | ⋮ | ⋮ |

612

| ID | MAXIMUM LENGTH | OFFSET |
|---|---|---|
| 00001 | 12 | 0 |
| 00002 | 11 | 12 |
| 00003 | 21 | 23 |
| 00004 | 17 | 44 |
| ⋮ | ⋮ | ⋮ |

```
825 — ⋮
826 — Mul Reg2, Y
827 — Add Reg2, X
828 — Load BaseReg, StartAddr
       Add BaseReg, Offset
       ⋮

829 —
830 — Mov Reg3, [BaseReg+Reg2+0]
831 — Mov DispReg1, Reg3
832 — Mov DispReg2, 12
       Call DisplayDevice
       ⋮

833 —
834 — Mov Reg3, [BaseReg+Reg2+12]
835 — Mov DispReg1, Reg3
836 — Mov DispReg2, 11
       Call DisplayDevice
       ⋮

837 —
838 — Mov Reg3, [BaseReg+Reg2+23]
839 — Mov DispReg1, Reg3
840 — Mov DispReg2, 21
       Call DisplayDevice
       ⋮

841 —
842 — Mov Reg3, [BaseReg+Reg2+44]
843 — Mov DispReg1, Reg3
844 — Mov DispReg2, 17
       Call DisplayDevice
       ⋮
```

```
                ⋮
902 ─  LocaleJudgment:
                ⋮
903 ─
904 ─  Load BaseReg, StartAddr
       Add BaseReg, Offset
                ⋮
905 ─
906 ─  Mov Reg3, Reg2
907 ─  Mul Reg3, 12
908 ─  Lea Reg4, [BaseReg+Reg3+X+0]
909 ─  Mov DispReg1, Reg4
910 ─  Mov DispReg2, 12
       Call DisplayDevice
                ⋮
911 ─
912 ─  Mov Reg3, Reg2
913 ─  Mul Reg3, 11
914 ─  Lea Reg4, [BaseReg+Reg3+X+36]
915 ─  Mov DispReg1, Reg4
916 ─  Mov DispReg2, 11
       Call DisplayDevice
                ⋮
917 ─
918 ─  Mov Reg3, Reg2
919 ─  Mul Reg3, 21
920 ─  Lea Reg4, [BaseReg+Reg3+X+69]
921 ─  Mov DispReg1, Reg4
922 ─  Mov DispReg2, 21
       Call DisplayDevice
                ⋮
923 ─
924 ─  Mov Reg3, Reg2
925 ─  Mul Reg3, 17
926 ─  Lea Reg4, [BaseReg+Reg3+X+132]
927 ─  Mov DispReg1, Reg4
928 ─  Mov DispReg2, 17
       Call DisplayDevice
                ⋮
```

900

COMPILER, COMPILE METHOD AND COMPILE APPARATUS

CROSS-REFERENCE TO RELATED APPLICATION

This application is based in and claims the benefit of priority from the prior Japanese Patent Application No. 2014-072012 filed on Mar. 31, 2014, the entire contents of which are incorporated herein by reference.

FIELD

The embodiments discussed herein are related to a compiler, a compile method, and a compile apparatus.

BACKGROUND

Many softwares have been multilingualized recent years. Further, various researches on coping with the problems resulting from the multilingualization are also being conducted.

For example, information processing apparatuses are suggested as follows in order to deal with matters regarding control at the time when fonts are registered in a printer. The following information processing apparatuses intend to allow an optimum character registration to be achieved always without causing an increase of man-hours required for maintenance or a development cost in order to improve the printing performance of a two-byte font.

First of all, a locale ID (identifier) maintained in an OS (Operating System) is discerned on a corresponding information processing apparatus. Also, the corresponding information processing apparatus refers to the discerned locale ID to determine the number of characters to be registered in a fixed area as well as a variable area. Thereafter, the corresponding information processing apparatus registers fonts, which have a higher use frequency in the corresponding information processing apparatus, in the fixed area of the printer, and registers fonts, which have a lower use frequency in the corresponding information processing apparatus than the fonts registered in the fixed area, in the variable area.

Further, the number of multilingualized web pages is also increasing. Also, the following techniques for making it possible to reduce the time required for a process of generating a dynamic content by using JSP (Java (registered trademark) Server Pages) are also suggested.

In an apparatus for generating a program which prepares the dynamic content, it is assumed that texts are handled by being represented by a predetermined general character encoding. In the meantime, the following two modules are installed in the corresponding apparatus.

Module for generating a program which prepares the dynamic content based on a predetermined file containing a static text for constituting a static portion of the content.

Module for preparing information of character codes by the character encoding for contents regarding the static text in advance so that information of character codes may be used by the program.

In the meantime, the multilingualization does not have a relevancy only on the printer or the web page. Recently, the multilingualization for various applications including an enterprise system is being progressed.

Related techniques are disclosed in, for example, Japanese Laid-Open Patent Publication No. 2003-044472 and Japanese Laid-Open Patent Publication No. 2005-332146.

SUMMARY

According to an aspect of the embodiments, a compiler includes: a memory; and a processor coupled to the memory and configured to execute a compilation process, the compilation process includes: reading a source code to be compiled and literal tuples each of which is a combination of a plurality of string literals having meanings that correspond to each other between a plurality of languages, and generating a code in which regarding each literal tuple, a calculation byte length which is greater than or equal to a longest byte length of the string literal among the literal tuple is allocated to each of the plurality of string literals that belong to the literal tuple and a start address of each string literal is referenced according to a locale designated at an execution time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a table exemplifying data used in the second embodiment;

FIG. 11 is a diagram (a second view) exemplifying the sequence of instructions generated in the second embodiment;

FIG. 15 is a diagram exemplifying the sequence of instructions generated in the third embodiment.

DESCRIPTION OF EMBODIMENTS

Figure 1:
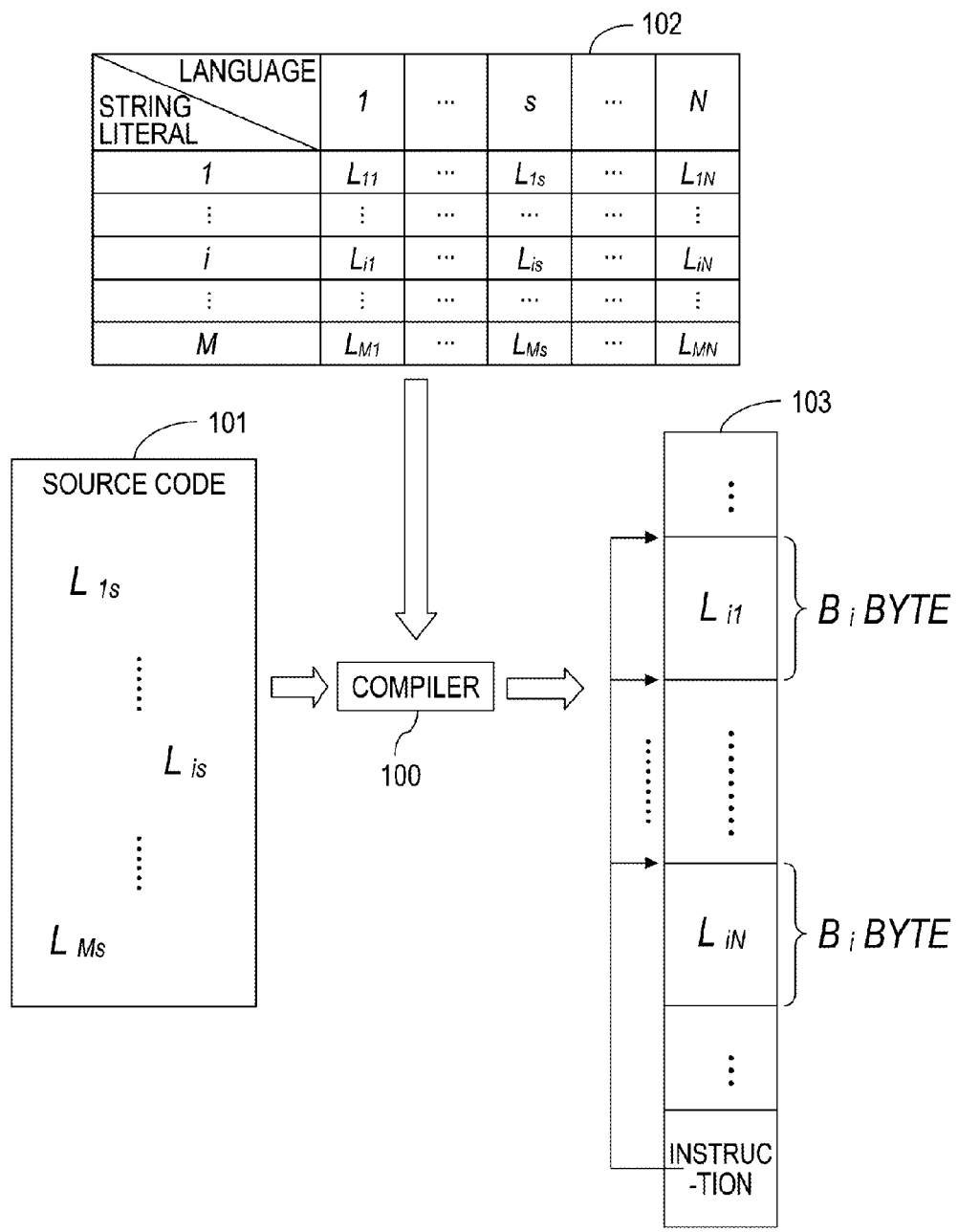
FIG. 1 is a diagram for explaining a compilation process executed by a compiler according to a first embodiment.

Hereinafter, embodiments of the present disclosure will be described with reference to the accompanying drawings in detail. Descriptions will be made on the following sequence.

First of all, descriptions will be made to clarify the significance of advantages for various embodiments. Next, descriptions will be made on a first embodiment with reference to FIG. 1. Thereafter, descriptions will be made on a first comparative example to a third comparative example with reference to FIG. 2 to FIG. 5 in order to assist understanding of various embodiments. Subsequently, descriptions will be made on a second embodiment to a fourth embodiment with reference to FIG. 6 to FIG. 16. Finally, descriptions will be made on other embodiments.

A plurality of string literals having meanings corresponding to each other and written in a plurality of natural languages may be different from each other in length. In the meantime, it is uncertain to determine an environment where the multilingual application is actually executed at the time when the source code of the application is compiled.

Accordingly, the matters that "which one of a plurality of string literals of a plurality of languages that may be different from each other in length is suitable for the locale that the application is actually executed" is not determined at the time when the source code is compiled. Such indeterminacy may become a factor which causes increase in cost in a broad sense in at least one phase of the life cycle of the multilingual application and as a result, some kind of difficulty or problem may be caused.

For example, the cost in the meaning of the work of a person who is in charge of development or maintenance may be increased due to the indeterminacy described above. In another example, the computational cost resulting from an execution of the application may be increased due to the indeterminacy. Increase in cost is a factor which hinders the multilingualization of the application.

In particular, according to various embodiments as will be described below, it is possible to further reduce a certain cost at least one stage of, for example, development, execution, and maintenance stages during the life cycle of the multilingual application than in the first to third comparative examples. Reduction of cost is beneficial to promote the multilingualization of the application. Accordingly, it is expected that the compiler according to each embodiment will help promoting the multilingualization of the application.

The importance of multilingualization of various applications including the enterprise system is increasing. The reasons are as follows.

In recent years, for example, the domestic market in Japan is becoming stagnant as the market is becoming matured. Therefore, the number of companies seeking overseas business development is increasing. Specifically, activities taken by companies for globalization (e.g., increasing overseas investments in the field of ICT (Information and Communication Technology)) are becoming accelerated.

In the related art, the enterprise system used at overseas bases of the companies has been committed to individual overseas bases in many cases. However, due to an advent of an era in which a cloud service is used in earnest, globalization (in other words, internationalization) of the enterprise system is now under way. Accordingly, the importance of internationalization and multilingualization of various applications including the enterprise system is increasing in recent years.

Various enterprise systems implemented with various programming languages exist but among other languages, COBOL (Common Business-Oriented Language) is used in implementation of many enterprise systems. Accordingly, in the following descriptions, COBOL is mainly exemplified. However, other than COBOL, respective embodiments may be applied to a high-level language, such as C language.

COBOL is equipped with an internationalization support functionality. For example, handling of the multi-octet character such as the Chinese character is specified in a COBOL specification. With the internationalization support functionality, COBOL application targeted for various languages (or various cultural regions) may be easily developed.

However, only the functionality with which inputting and outputting of the multi-octet character is made easy is insufficient to achieve internationalization of the application. A so-called "cultural adaptation" functionality for specifying the operations in a plurality of languages or cultural regions is beneficial for internationalization of the application.

In the meantime, the COBOL standard regarding the cultural adaptation remains in a limited range regarding, for example, a conversion of currency or time. The cultural adaptation functionality defined in the COBOL standard does not include the functionality of "selecting and outputting national literals written in a suitable natural language among several national literals according to the locale". That is, the functionality defined in the COBOL standard has limitations.

Therefore, a COBOL compiler provided by a vendor of a COBOL development environment just outputs an object code which is targeted for a specific single language or cultural region at the time of compiling the program which contains natural literals. Accordingly, each application developer is forced to perform a countermeasure in order for the application to include the cultural adaptation.

For example, a method that "several resource files per locale are prepared in addition to a body of an application" may be considered. Details of the method will be described later as a first comparative example.

As another example, a method that "a plurality of source files corresponding to a plurality of locales are prepared and the source file per locale is compiled, thereby generating a plurality of executable files corresponding to the plurality of locales" may also be considered. Details of the method will be described later as a second comparative example.

In particular, as will be described below, the first comparative example and the second comparative example have room for improvements in that the first and the second comparative examples cause an occurrence of costs during the life cycle of the application in a broad sense. That is, the costs needed for the cultural adaptation functionality (e.g., for making the application to be internationalized and multilingualized) is still high for now regardless of the fact that the importance of internationalization and multilingualization of the application increases as described above.

Accordingly, it is significant to provide a technique to reduce the costs needed for making the application to be internationalized and multilingualized. Especially, it is significant that the functionality which is helpful for the cost reduction is provided by the compiler. This is because dependency on skill or endeavor of each application developer is reduced when the functionality is provided by the compiler.

The compilers according to the following various embodiments have an effect of reducing the costs that may be occurred when intending to make the application to be internationalized and multilingualized. Accordingly, it is expected that the compilers according to respective embodiments may help promoting the multilingualization of the application.

In the meantime, FIG. 1 is a diagram for explaining a compilation process executed by a compiler according to a first embodiment. In the descriptions on FIG. 1, a specific example may be referenced in the embodiment which will be described later in order to help understanding.

In FIG. 1, a compiler 100, a source code 101 to be compiled, and definition information 102 are illustrated. Hereinafter, a combination of a plurality of string literals having meanings that correspond to each other between the plurality of languages is called a "literal tuple". The definition information 102 is information which defines the literal tuple.

The number of literal tuples defined in the definition information 102 is one or more. In the example of FIG. 1, M sets of literal tuples are defined ($1 \leq M$). For example, the ith ($1 \leq i \leq M$) literal tuple is a combination of string literals Li1, ..., LiN written in N ($1 < N$) types of languages and having meanings that correspond to each other.

In FIG. 1, an example in which the object code 103 (e.g., code written in a machine language) is generated by the compiler 100 is illustrated. Depending on the embodiment, the compiler 100 may generate an assembly code written in an assembly language.

Further, the compiler 100 is a kind of a program executed by a computer (e.g., a computer 700 of FIG. 8 which will be described later). The computer operates as a compile apparatus by executing the program of the compiler 100. In the following, in order to simplify the descriptions, descriptions may be made simply as "the compiler 100 generates the object code 103" instead of describing as "the computer executes the program of the compiler 100 to generate the object code 103".

The compilation process that the compiler 100 causes the computer to execute includes reading the source code 101 and the definition information 102. Further, the compilation process includes generating a code (specifically, the object code 103 or the assembly code).

Further, the definition information 102 may be contained in a source file in which the source code 101 is written. Otherwise, the definition information 102 may be contained in a separate file (e.g., a locale resource file 502 of FIG. 6 which will be described later) from the source file.

The source code 101 may contain a corresponding string literal or a reference to the corresponding string literal regarding each of the plurality of string literals written in one language of the plurality of languages (e.g., N types of languages in the example of FIG. 1). For example, the source code 101 may contain the plurality of string literals itself written in one of the plurality of languages. Otherwise, the source code 101 may contain references to the plurality of string literals written in the corresponding one language. Of course, the source code 101 may include one or more string literals themselves and the references to the one or more string literals.

The string literals may be described either in the source code 101 in order to set, for example, a value in a constant or a variable or in the source code 101 as a function parameter.

A format of the reference to the string literal depends on the specification of a programming language. For example, when the source code 101 is written in C language, a name of macro which defines the string literal may be contained in the source code 101 as a kind of reference to the string literal.

For convenience of explanation, a case where M string literals L1s, ..., LMs that are written in the sth ($1 \leq s \leq M$) language are contained in the source code 101 is illustrated in FIG. 1.

In the object code 103, a "calculation byte length" which is equal to or greater than a byte length of the longest string literal in the corresponding literal tuple is allocated to each of the plurality of string literals that belong to the corresponding literal tuple, regarding each literal tuple. For example, the calculation byte length allocated to each of the string literals Li1, ..., LiN that belong to the ith literal tuple is Bi byte in the example of FIG. 1.

That is, Bi is a value which is equal to or greater than the byte length of the longest string literal among the string literals Li1, ..., LiN. Accordingly, each string literal Lij ($1 \leq j \leq N$) falls within a range of Bi byte allocated to the string literal Lij. Accordingly, generation of, for example, dangerous instruction which is likely to cause an unauthorized memory access beyond the range of Bi byte which is resulted from referring to the string literal, is prevented naturally.

Specifically, the calculation byte length corresponding to each literal tuple may be the byte length itself of the longest string literal among the plurality of string literals that belong to the corresponding literal tuple. Otherwise, the calculation byte length corresponding to each literal tuple may be a minimum byte length which satisfies the condition that "the minimum byte length is the multiple of a predetermined byte length which is unit of memory management and is equal to or greater than the byte length of the longest string literal among the plurality of string literals that belong to the corresponding literal tuple".

Further, according to the object code 103, a start address of each string literal is referenced according to the locale (e.g., locale which is set in the OS in an execution environment) designated at the time of execution. In other words, the compiler 100 generates a suitable object code 103 such that the start address of each string literal is referenced according to the locale designated at the time of execution. That is, a plurality of instructions which cause the computer (e.g., the computer which executes the executable file generated from the object code 103) to refer to the start address of each string literal according to the locale in execution is contained in the object code 103.

Further, more specifically, the "start address of each string literal" corresponds to a start address of the string literal of the language according to the locale in execution, among the plurality of string literals that belong to each literal tuple.

In FIG. 1, for convenience of explanation, the references to the start addresses are represented by arrows. As represented by the arrows, the instruction for referring to one of the start addresses of the string literals Li1, ..., LiN according to the locale in execution is contained in the object code 103.

The compiler 100 generates the plurality of instructions as described above and inserts the generated plurality of instruction in the object code 103. More specifically, the plurality of instructions may contain the following instructions.

One or more instructions, for example, instructions 803, 804, and 805 of FIG. 10 which will be described later, for acquiring locale identification information which indicates the locale designated at the time of execution.

One or more instructions, for example, instructions 807, 808, 810, 812, 813, 815, 817, 818, and 820 of FIG. 10 which will be described later, for performing a conditional branch according to the locale identification information.

One or more instructions, for example, instructions 809, 814, 819, 822, 825~830, 833, 834, 837, 838, 841, and 842 of FIG. 10 and FIG. 11 or instructions 905~908, 911~914, 917~920, and 923~926 of FIG. 15 which will be described later, for referring to the start address of each string literal using one of a plurality of numeric values (e.g., N different numeric values in the example of FIG. 1) corresponding to the number of the plurality of languages.

One or more instructions for calculating the start address may be contained in one or more instructions for referring to the start address of the string literal. The instruction for calculating the start address may be an arithmetic instruction, for example, an add instruction or a multiply instruction. As another example, the instruction for calculating the start address may be a different type instruction in which performing an arithmetic operation (addition) of a value maintained in a certain register with a designated numeric value is designated in the operand.

Figure 10:
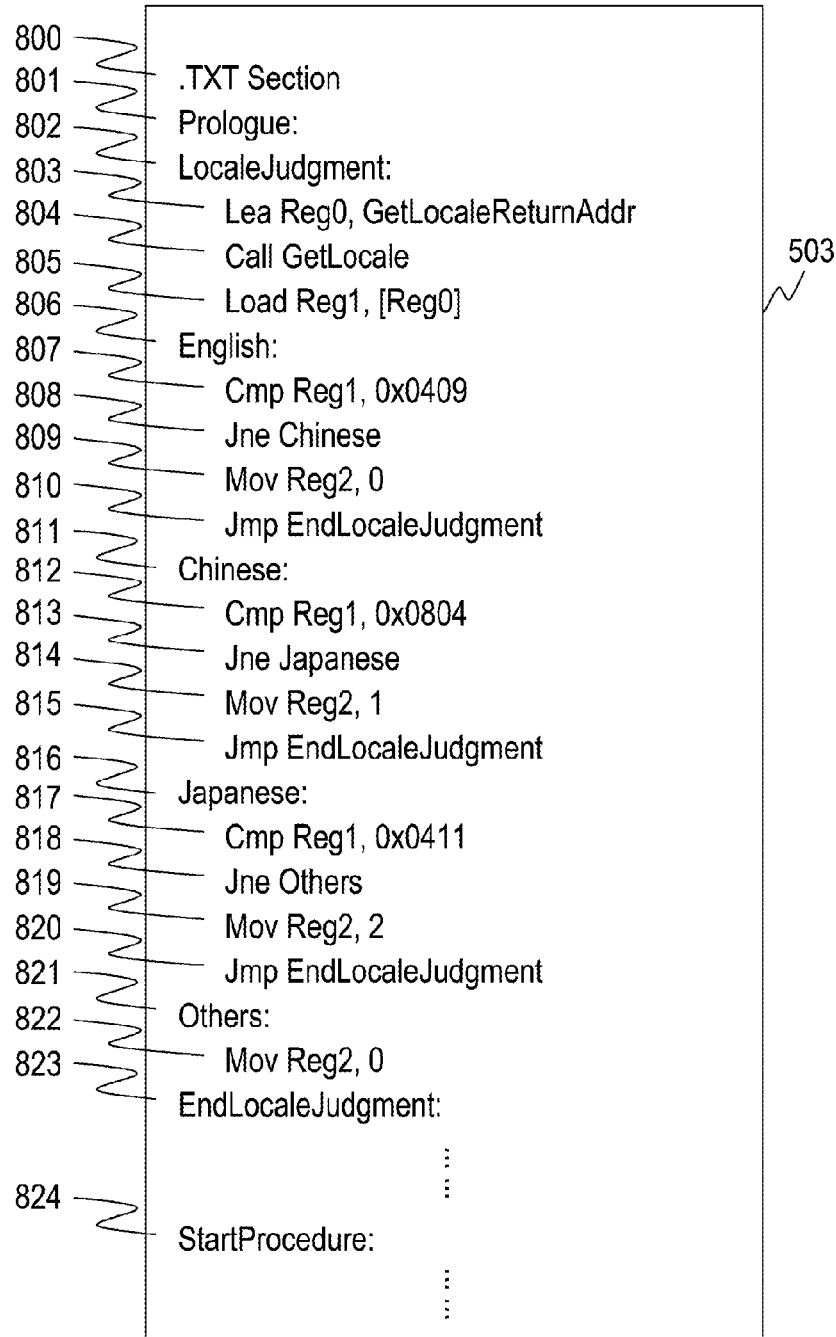
FIG. 10 is a diagram (a first view) exemplifying the sequence of instructions generated in the second embodiment.

For example, instructions 809, 814, 819, 822, 825~830, 833, 834, 837, 837, 841 and 842 are illustrated in FIG. 10 and FIG. 11 which will be described later. These instructions are examples for calculating and referring to the start address using one of three numeric values of "0", "1", and "2" that correspond to three languages.

As another example, instructions 905~908, 911~914, 917~920, and 923~926 are illustrated in FIG. 15 which will be described later. These instructions are examples for calculating and referring to the start address using one of three numeric values of "0", "1", and "2" that correspond to three languages.

In the examples of FIG. 10, FIG. 11 and FIG. 15, the "plurality of numeric values" described above are consecutive integers of "0", "1", and "2". However, a plurality of numeric values, for example, "0", "Y", and "2Y" that are non-consecutive (e.g., specific example of "Y" will be described later together with FIG. 6) may be used depending on the embodiment.

Further a plurality of numeric values, for example, "α", "β+Y", and "γ+2Y" that are numerical values of non-equivalent interval, may be used depending on the embodiment. Further, it is assumed that "α", "β", and "γ" are suitable values determined according to installation by the compiler 100.

The number of "plurality of numeric values" may well be a number other than 3 according to the number (e.g., "N" in FIG. 1) of target languages for defining the string literals in the definition information 102.

In the meantime, there may be two types of placement of the plurality of string literals in the object code 103. The second embodiment which will be described later is an example in which a first type of placement is adopted and the third embodiment which will be described later is an example in which a second type of placement is adopted.

According to the first type of placement, in the object code 103, the string literals are placed for each language and a plurality of string literals of the corresponding language are placed in the order in which plurality of string literals are defined between the literal tuples, regarding each language. For example, in the first type placement, MN string literals may be placed in the object code 103 in the order of "L11, . . . , LM1, L12, . . . , LM2, L1N, . . . , LMN".

In the meantime, according to the second type of placement, in the object code 103, the string literals are placed for each literal tuple and the plurality of string literals that belong to the corresponding literal tuple are placed in the order in which the plurality of string literals are defined between the plurality of languages, regarding each literal tuple. For example, in the second type placement, MN string literals may be placed in the object code 103 in the order of "L11, . . . , L1N, L21, . . . , L2N, . . . , LM1, . . . , LMN".

The compiler 100 generates a suitable instruction according to whether which one of the first type of placement and the second type of placement is intended to be adopted. Further, even in a case where any one of the first and second types of placement is adopted, the "calculation byte length" is allocated to each of the plurality of string literals that belong to the corresponding literal tuple regarding each literal tuple in the object code 103.

When the first type of placement is adopted, the compiler 100 may cumulatively add the calculation byte length to calculate an offset corresponding to each literal tuple. A specific example of the offset will be described later along with FIG. 9. In this case, one or more instructions for referring to the start address of each string literal may contain the instruction, in which operands including the offset are designated (for example, instructions 829, 833, 837, and 841 of FIG. 11 which will be described later).

Further, when the first type of placement is adopted, the compiler 100 may also calculate a total of the calculation byte lengths of all the literal tuples. For example, the total is (B1+ . . . +Bi+ . . . +BN) in the example of FIG. 1 and the total is "Y" in the example of FIG. 11 which will be described later. In this case, one or more instructions for referring to the start address of each string literal may contain the instruction for calculating the start address of the range within which the plurality of string literals of a single language which corresponds to the locale in execution among the plurality of languages are placed, based on the total of the calculation byte lengths.

For example, when the language which corresponds to the locale in execution is the jth language among N languages, the range is, specifically, a range within which the string literals L1j, . . . , LMj are placed.

For example, the compiler 100 may determine the plurality of numeric values (see descriptions on one or more instructions for referring to the start address of each string literal) described above based on the calculated total (see the example in which "0", "Y", and "2Y" are used as the plurality of numeric values).

Otherwise, the compiler 100 may generate the instruction for calculating the start address of the range using one of the plurality of numeric values and the calculated total. For example, in the examples of FIG. 10 and FIG. 11, "0", "1", and "2" are used as the plurality of numeric values and the calculated total is "Y". Also, the start addresses of the range regarding three languages are "(StartAddr+Offset+X)", "(StartAddr+Offset+X+Y)", and "(StartAddr+Offset+X+2Y)", respectively, and these start addresses may be calculated in the course of the execution of instructions 825~829, 833, 837, and 841.

Although details will be described along with the second embodiment, for example, the instruction 825 is an instruction for storing a result of multiplication of one of the plurality of numeric values ("0", "1", or "2") with the calculated total ("Y") in a predetermined register. Further, calculating the start address of the range using the value of the corresponding predetermined register is represented as "BaseReg+Reg2" in the operands of instructions 829, 833, 837, and 841.

In the meantime, the "order in which the string literals are defined between the literal tuples" in the first type of placement may be ordered based on the order in which the string literals (or references to the corresponding string literals) written in a single language appear in the source code 101. This is because a process of replacing the order of appearance in the source code 101 is unnecessary, and thus translation performed by the compiler 100 may be simplified. Further, the order in which the string literals are defined between the literal tuples is represented by an index of "1, . . . , i, . . . , M" in the example of FIG. 1 and the sequence represented by the index is the same as the appearance sequence of the string literals in the source code 101.

In the meantime, in the second type of placement, the "order in which the string literals are defined between the plurality of languages" may be, for example, the order in which the string literals are defined by the definition information 102. For example, the order in which the string literals are defined between the plurality of languages is represented by an index of "1, . . . , s, . . . , M" in the example of FIG. 1.

When the second type of placement is adopted, the compiler 100 may cumulatively add the calculation byte length to calculate a first value (e.g., the value of "offset" field in FIG. 9 which will be described later) corresponding to each literal tuple. In this case, one or more instructions for referring to the start address of each string literal may contain the instruction, in which operands including the number of plurality of languages (e.g., "N" in the example of FIG. 1 and "3" in the examples of FIG. 14 and FIG. 15) and a second value determined according to the first value.

Although details will be described along with the third embodiment, for example, in FIG. 15 which will be described later, the instruction 907 in which the operand including "3" which is the number of the plurality of languages and the value (e.g., "0" which is a result of multiplication of "3" and "0") determined according to the value of "0" which is represented as the offset in FIG. 9 are designated is illustrated. Similarly, in FIG. 15, the instruction 913 in which the operand including the value (e.g., "36" which is a result of multiplication of "3" and "12") which is determined according to two values of "3" and "12" are designated is illustrated. Instructions 919 and 925 are instructions similar to the instructions 907 and 913.

In the meantime, a specific natural language may be used in the first locale and the second locale. For example, the English language is used in the United States and Britain.

When a specific natural language is used in the first locale and the second locale, two of the plurality of languages (e.g., N types of languages in FIG. 1) may be the specific natural language used in the first locale and the specific natural language used in the second locale. For example, when the first locale and the second locale are identified as names of "en-us" and "en-gb", respectively, the English language used in the United States and the English language used in the Britain may be handled as two different languages.

As described above, in the embodiment in which the specific natural language used in the first locale and the specific natural language used in the second locale are discerned, instructions used for the following process are contained in the plurality of instructions generated by the compiler 100.

When the locale identification information indicates the first locale, the start address is calculated by using the first numeric value among the plurality of numeric values (e.g., see descriptions on one or more instructions for referring to the start address of each string literal) described above.

When the locale identification information indicates the second locale, the start address is calculated by using the second numeric value among the plurality of numeric values described above.

Further, the first numeric value corresponds to the specific natural language used in the first locale. Accordingly, the start address calculated using the first numeric value is a start address of the string literal written in the specific natural language used in the first locale. Further, the second numeric value corresponds to the specific natural language used in the second locale. Accordingly, the start address calculated using the second numeric value is a start address of the string literal written in the specific natural language used in the second locale.

In contrast, an embodiment in which the specific natural language used in the first locale and the specific natural language used in the second locale are not discerned may be made. For example, when the first locale and the second locale are identified as the names of "en-us" and "en-gb", respectively, the language identified as two characters of "en" (the English language) corresponds to the "specific natural language" which is common between the first locale and the second locale. That is, an embodiment may be made in which the English language used in the United States and the English language used in the Britain may be handled as the same English language without being discerned.

When the specific natural language used in the first locale and the specific natural language used in the second locale are not discerned, one of the plurality of languages (e.g., N types of languages in FIG. 1) may be the specific natural language which is common between the first locale and the second locale. In this case, the following instructions may be contained among the plurality of instructions generated by the compiler 100.

That is, the instruction for calculating the start address using a numeric value of the plurality of numeric values is contained among the plurality of instructions, in any one of a case where the locale identification information indicates the first locale and another case where the locale identification information indicates the second locale. The start address calculated as described above corresponds to a start address of the string literal written in the natural language which is common between the first locale and the second locale.

In the meantime, the language used in the locale designated at the time of execution may be different from any one of the plurality of languages (e.g., N types of languages in FIG. 1). Therefore, the compiler 100 may determine one of the plurality of languages as a default language to be used in such a case. A specific example of a method of determining the default language will be described later.

Here, for convenience of explanation, it is assumed that a numeric value corresponding to the default language among the plurality of numeric values (e.g., see descriptions on one or more instructions for referring to the start address of each string literal) is the "default numeric value". When the compiler 100 determines the default language, the following instructions are contained in the generated plurality of instructions. That is, when the locale identification information indicates a locale which uses a language different from any one of the plurality of languages, the instruction for calculating the start address using the default numeric value is contained in the plurality of instructions.

For example, in the second embodiment which will be described later, the default language is the English language and the default numeric value is 0 (zero). In FIG. 10, an instruction 822 for calculating the start address using the default numeric value is illustrated.

In the meantime, the process of generating the object code 103 may include any one of the following processes.

A process, for example, step S206 to step S208 of FIG. 13 which will be described later, in which each string literal, which has a length less than the calculation byte length, among the plurality of string literals that belong to the corresponding literal tuple is padded with a predetermined characters and the string literal padded with the predetermined characters are placed in the object code 103, regarding each literal tuple.

A process in which a numeric value which indicates a length of each of the plurality of string literals that belong to each literal tuple is embedded in the object code 103 (see, e.g., FIG. 16) and in which the instruction for referring to the address to which the numeric value indicating the length is embedded is generated.

Further, the source code 101 may contain the language independent string literals or the references to the language independent string literals without depending on the locale. In this case, the process of generating the object code 103 includes a process of inserting the language independent string literals in the object code 103. For example, as in FIG. 6 which will be described later, all the language independent string literals may be placed ahead of the string literals of the plurality of languages. Depending on the embodiment, the language independent string literals may be placed behind the string literals of the plurality of languages.

Subsequently, descriptions will be made on a first comparative example to a third comparative example in order to help understanding the advantages of the first embodiment described above and various embodiments which will be described later.

Figure 2:
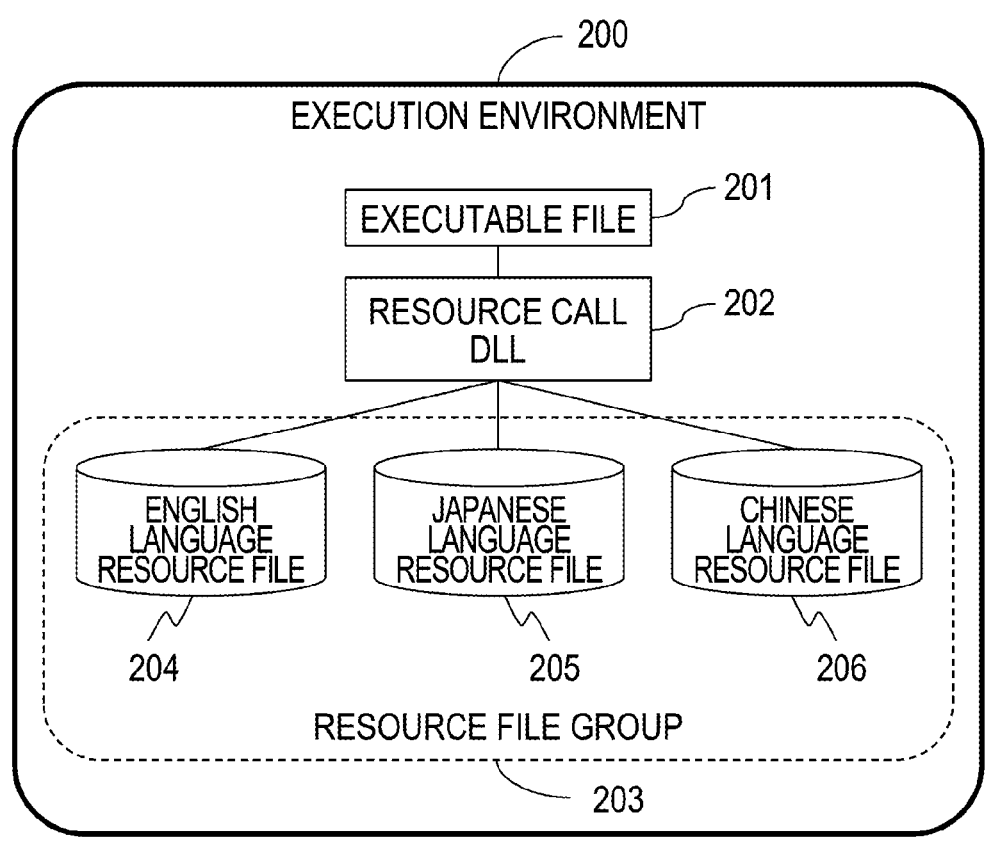
FIG. 2 is a diagram for explaining a first comparative example.

FIG. 2 is a diagram for explaining a first comparative example. Various embodiments are superior to the first comparative example in the following two points. In a certain aspect, various embodiments intend to have superiority to the first comparative example as follows.

An execution overhead is smaller than the first comparative example. In other words, a computational cost for execution is smaller than the first comparative example.

Maintenance cost after the service initiation is smaller than the first comparative example.

As illustrated in FIG. 2, an executable file 201, a resource call DLL (Dynamic Link Library) 202, and a resource file group 203 are utilized in an execution environment 200 of the first comparative example. The resource file group 203 is a set of N resource files (1<N). These N resource files correspond to N types of natural languages used in N types of locales. In the example of FIG. 2, N=3 and the resource file group 203 includes an English language resource file 204, a Japanese language resource file 205, and a Chinese language the resource file 206.

The English language resource file 204 contains M string literals of the English language (1≤M). M string literals having meanings correspond to those M string literals of the English language and written in the Japanese language are contained in the Japanese language resource file 205. Further, M string literals having meanings correspond to those M string literals in the English language resource file 204 and written in the Chinese language are contained in the Chinese language resource file 206.

Respective string literals in each resource file are identified by an identifier (ID) such as a code number. The same ID is allocated to three string literals of the English language, the Japanese language and the Chinese language having the meanings that correspond to each other.

At least the following sequence of instructions is contained in the executable file 201.

Sequence of instructions for recognizing the locale in the execution environment 200 where the executable file 201 is executed. For example, sequence of instructions for acquiring the value which indicates the locale set in the Operating System (OS) of the execution environment 200 through an Application Programming Interface (API) provided by the OS.

Sequence of instructions for selecting the resource file according to the acquired value (e.g., according to the locale in execution) and reading the string literals from the selected resource file through the resource call DLL 202.

Accordingly, according to the first comparative example, when the executable file 201 is executed, the string literal of the English language, the Japanese language, or the Chinese language is read according to the locale of the execution environment 200. The executable file 201 also contains the sequence of instructions for displaying the string literals read from the resource file. Accordingly, the string literals are displayed in the language according to the locale of the execution environment 200. That is, the multilingualization is implemented according to the first comparative example.

However, an execution overhead is relatively large in the first comparative example. In other words, the computational cost in execution is relatively high in the first comparative example.

This is because a certain resource file within the resource file group 203 is accessed through the resource call DLL 202 at the time of execution. Specifically, an overhead for calling the resource call DLL 202 from the executable file 201 occurs. Further, an overhead due to a disk access for referring to the resource file occurs. As described above, an overhead occurred for referring to the resource file at the time of execution may cause reduction of an execution efficiency.

Further, the resource file group 203 is used at the time of execution in the first comparative example. Accordingly, in the first comparative example, a cost for suitably managing the respective resource files within the resource file group 203 may occur even after the service initiation. For example, it may be considered that a system manager may perform a certain manual work so that the resource file group 203 is not erroneously deleted, moved, or edited by an end user.

Subsequently, descriptions will be made on a second comparative example with reference to FIG. 3 and FIG. 4. The execution overhead as in the first comparative example does not occur in the second comparative example. Further, since the resource file group 203 is not used at the time of execution in the second comparative example, the cost for managing the resource file group 203 is unnecessary.

However, in the second comparative example, the programmer prepares and compiles the source file per locale and builds an executable file per locale. Accordingly, in the second comparative example, it takes a time required for preparing and compiling the source file which is longer than in the first comparative example. Further, in the second comparative example, a more labor for building the executable file is required compared to the first comparative example.

As described above, the second comparative example has a disadvantage that a burden of the programmer is relatively large (e.g., a development cost is high). In particular, as will be described below, various embodiments have a lower cost for development compared to the second comparative example. That is, in a certain aspect, various embodiments intend to lower the cost for development compared to the second comparative example.

For example, it is assumed that a certain application may have a possibility of being used in three execution environments (e.g., three locales) of an execution environment where the Japanese language is used, an execution environment where the English language is used, and an execution environment where the Chinese language is used. In this case, in the second comparative example, the programmer prepares three source files in the development environments of three languages.

Also, each source file is compiled by the compiler within each development environment and as a result, three object files corresponding to three languages are obtained.

Each object file is suitably linked to another object file by the linker. As a result, three executable files corresponding to three languages are obtained. The end user executes an executable file according to an environment of the computer which is used by the end user among three executable files.

Figure 3:
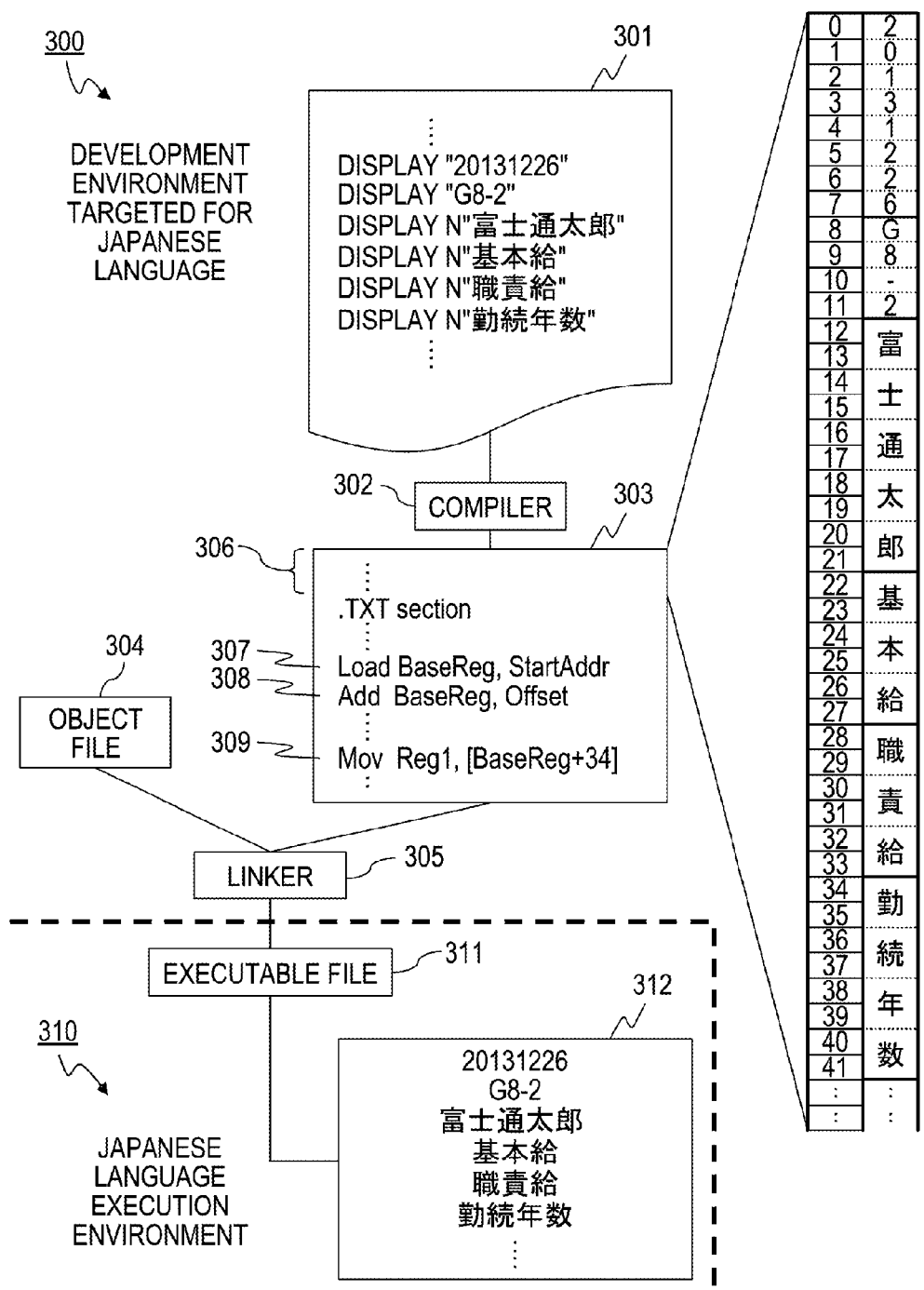
FIG. 3 is a diagram (a first view) for explaining a second comparative example.

Specifically, in FIG. 3, a development environment 300 which is targeted for the Japanese language and an execution environment 310 of the Japanese language are illustrated.

The programmer prepares a source file 301 containing the string literals written in the Japanese language in the development environment 300 which is targeted for the Japanese language. Further, for convenience of explanation, it is assumed that the source file 301 is written in COBOL. In COBOL terminology, the string literals represented by consecution of characters that belong to a designated national character set is called a national literal.

In FIG. 3, six string literals contained in the source file 301 are illustrated. Two string literals of "20131226" and "G8-2" are alphanumeric literals and the language independent string literals. That is, these two string literals are common string literals that are used regardless of the difference between the Japanese language, the English language and the Chinese language.

In the meantime, four string literals of "富士通太郎", "基本給", "職責給", and "勤続年数" are the language dependent string literals written in the Japanese language. That is, these four string literals are the national literals. Accordingly, "N" which indicates the national literal is designated in each of four DISPLAY statements for outputting four string literals.

In the meantime, the programmer assigns the source file 301 to the compiler 302 within the development environment 300 which is targeted for the Japanese language as an input. The compiler 302 compiles the source file 301 to generate an object file 303.

The compiler 302 as well as a linker 305 are provided in the development environment 300 which is targeted for the Japanese language. The linker 305 generates (that is, builds) the executable file 311 from the object file 303 and other object file 304.

When the executable file 311 is executed in the execution environment 310 of the Japanese language, six string literals of "20131226", "G8-2", "富士通太郎", "基本給", "職責給", and "勤続年数" are displayed in a screen 312.

In the meantime, details of the object file 303 are also represented in FIG. 3. The object file 303 contains at least an RO section (read-only section) 306 which is a storage area for the string literals and instructions 307, 308 and 309. Details of the RO section 306 are represented in a right end portion of FIG. 3.

Specifically, in the RO section 306, "20131226" is placed in byte 0 to byte 7 and "G8-2" is placed in byte 8 to byte 11. Further, in the RO section 306, "富士通太郎" is placed in byte 12 to byte 21, "基本給" is placed in byte 22 to byte 27, "職責給" is placed in byte 28 to byte 33, and "勤続年数" is placed in byte 34 to byte 41.

The instruction 307 is an instruction for reading (that is, loading) the start address on the memory of the object code in a base register. Further, in FIG. 3 and other figures which will be described later, the base register is represented as a name of "BaseReg" and the start address on the memory of the object code is represented as "StartAddr".

The instruction 308 is an instruction for adding an offset of the start address of the RO section 306 with respect to the start address of the object code to the value maintained in the base register and storing a result of the addition in the base register. In FIG. 3 and other figures which will be described later, the offset of the start address of the RO section with respect to the start address of the object code is represented as "Offset".

The instruction 309 is an instruction for storing a value obtained by adding the value maintained in the base register and the number "34" in a register having the name of "Reg1". That is, the instruction 309 is an instruction for storing the start address on the memory of the string literal having the name of "勤続年数" in the register Reg1. The instruction 309 is one of the plurality of instructions contained in the sequence of instructions for outputting the string literal having the name of "勤続年数" on the screen 312.

Further, in FIG. 3 and other figures which will be described later, for convenience of explanation, the object code is represented by an assembly language. However, the object code is actually a code (e.g., a machine code) of a machine language corresponding to the illustrated assembly code.

In the meantime, in the second comparative example, the programmer prepares a source file targeted for the English language which contains the string literals written in the English language in the development environment which is targeted for the English language (not illustrated). In the source file targeted for the English language, the string literals of the Japanese language within the source file 301 are replaced by the string literals of the English language, but both source files are the same on other points.

Specifically, two language independent string literals of the "20131226" and "G8-2" are contained in the source file targeted for the English language, similarly as in the source file targeted for the Japanese language 301. Further, four string literals written in the English language that have meanings corresponding to four string literals written in Japanese language contained in the source file 301 are also contained in the source file which is targeted for the English language. That is, four string literals of "Fujitsu Taro", "Base Salary", "Responsibility Salary", and "Length of Service" are also in the source file targeted for the English language.

The programmer assigns the source file targeted for the English language to the compiler 302 within the development environment targeted for the English language as an input. The compiler compiles the source file targeted for the English language to generate an object file 320 of FIG. 4.

The object file 320 is linked with other object file by the linker. As a result, the executable file (not illustrated) targeted for the execution environment of English language (not illustrated) is generated. When the executable file is executed, six string literals of "20131226", "G8-2", "Fujitsu Taro", "Base Salary", "Responsibility Salary", "Length of Service" are displayed on the screen.

Figure 4:
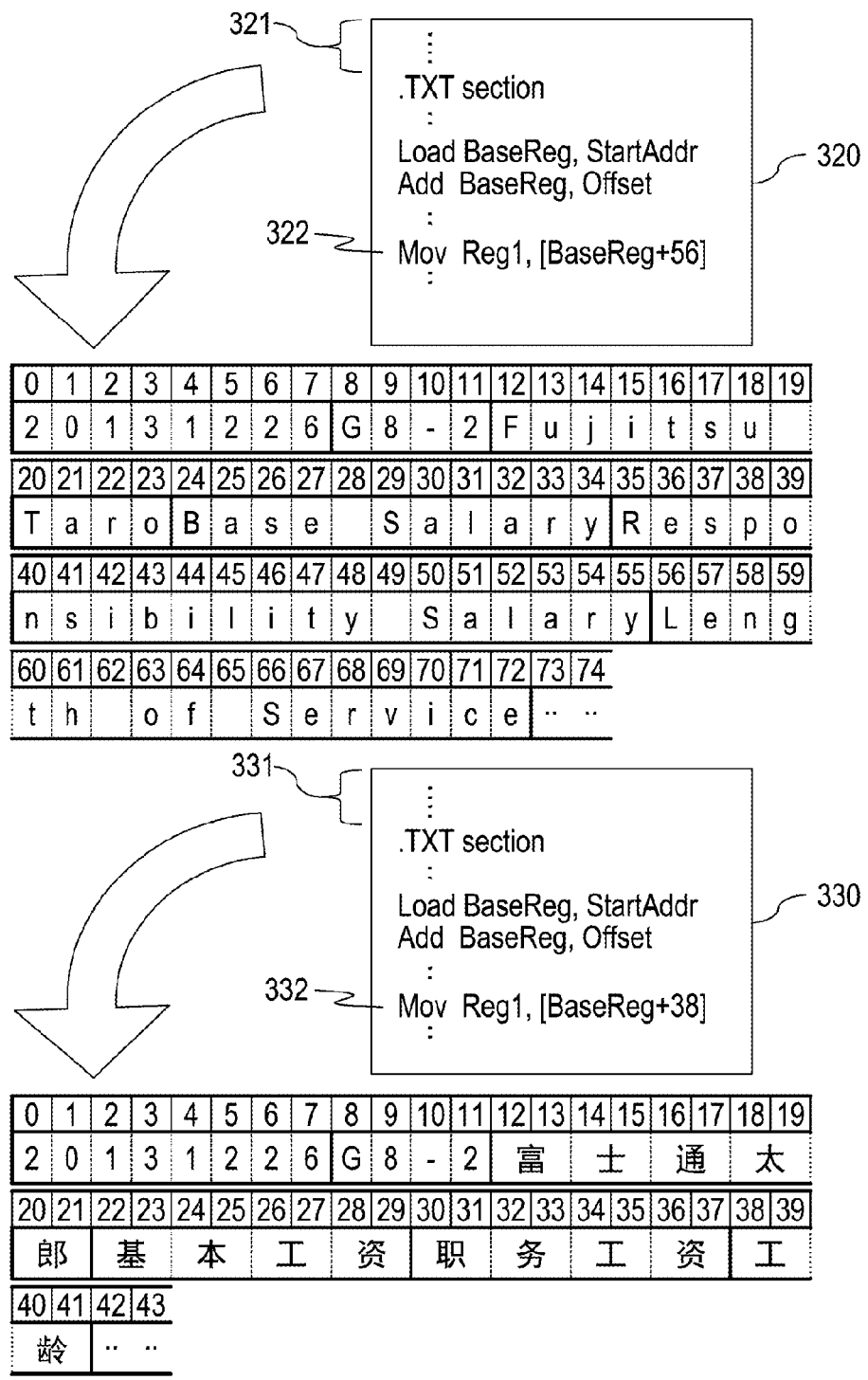
FIG. 4 is a diagram (a second view) for explaining the second comparative example.

In the meantime, details of the object file 320 are represented in FIG. 4. The object file 320 contains a RO section 321, two instructions that are the same as the instructions 307 and 308, and an instruction 322 of which operand is different from that of the instruction 309.

Specifically, in the RO section 321, the "20131226" is placed in byte 0 to byte 7 and the "G8-2" is placed in byte 8 to byte 11. Further, in the RO section 321, "Fujitsu Taro" having the meaning corresponding to "富士通太郎" is placed in byte 12 to byte 23. Also, "Base Salary" having the meaning corresponding to "基本給" is placed in byte 24 to byte 34. Further, "Responsibility Salary" having the meaning corresponding to "職責給" is placed in byte 35 to byte 55. Further, "Length of Service" having the meaning corresponding to "勤続年数" is placed in byte 56 to byte 72.

The instruction 322 is an instruction for storing a value obtained by adding the value maintained in the base register and the number "56" in the register Reg1. That is, the instruction 322 is an instruction for storing the start address on the memory of the string literal of the "Length of Service" in the register Reg1.

In the meantime, in the second comparative example, the programmer prepares source file targeted for the Chinese language which contains the string literals written in the Chinese language in the development environment targeted for the Chinese language (not illustrated). In the source file targeted for the Chinese language, the string literal of the Japanese language within the source file 301 is replaced by the string literal of the Chinese language, but both source files are the same on other points.

Accordingly, two language independent string literals of the "20131226" and "G8-2" are also contained in the source file targeted for the Chinese language. Further, four string literals written in the Chinese language having meanings corresponding to four string literals written in Japanese language contained in the source file 301 are also contained in the source file targeted for the Chinese language. That is, four string literals of "富士通太郎", "基本工资", "职务工资", and "工龄" are also in the source file targeted for the Chinese language. Further, although a person's name of "富士通太郎" is also represented in the same character between the Japanese language and the Chinese language, a proper noun which is represented by a different characters between the Japanese language and the Chinese language exists in proper nouns.

The programmer assigns the source file targeted for the Chinese language to the compiler within the development environment targeted for the Chinese language as an input. By doing this, the compiler generates the object file 320 of FIG. 4.

The object file 320 is linked with other object file by the linker. As a result, the executable file (not illustrated) targeted for the execution environment of Chinese language (not illustrated) is generated. When the executable file is executed, six string literals of "20131226", "G8-2", "富士通太郎", "职务工资", "职务工资", and "工龄" are displayed on the screen.

In the meantime, details of the object file 320 are represented in FIG. 4. The object file 320 contains a RO section 331, two instructions that are the same as those instructions 307 and 308, and an instruction 332 of which operand is different from that of the instruction 309.

Specifically, in the RO section 331, the "20131226" is placed in byte 0 to byte 7 and the "G8-2" is placed in byte 8 to byte 11. Further, in the RO section 331, "富士通太郎" of the Chinese language having the meaning corresponding to "富士通太郎" of the Japanese language is placed in byte 12 to byte 21. Also, "基本工资" having the meaning corresponding to "基本給" is placed in byte 22 to byte 29. Further, "职务工资" having the meaning corresponding to "職責給" is placed in byte 30 to byte 37. Further, "工龄" having the meaning corresponding to "勤続年数" is placed in byte 38 to byte 41.

The instruction 322 is an instruction for storing a value obtained by adding the value maintained in the base register and the number "38" in the register Reg1. That is, the instruction 322 is an instruction for storing the start address on the memory of the string literals of the "工龄" in the register Reg1.

As will be known from the above descriptions, the only difference between the instructions 309, 322, and 332 is just the operand. The reason the operand is different between the instructions 309, 322, and 332 is because the lengths of the string literals of the plurality of languages that have meanings corresponding to one another are not always the same. As a result, the object files 303, 320, and 330 are different from each other in the contents of the RO section for the string literals as well as operands of several instructions contained in the section for instructions. From a certain point of view, the fact that "The contents of the RO section as well as operands of instructions also depend on the language as described above." may also be regarded as a consequence of the compilation process having been performed separately for each language.

In the second comparative example, since the programmer prepares the source file for each language, a labor (e.g., a cost) required for preparing, maintaining and managing the source file is relatively large. Further, in the second comparative example, since the compilation process is separately performed for each language, a labor for the compilation process is also required.

Subsequently, descriptions will be made on the third comparative example with reference to FIG. 5. The third comparative example is an example that can be considered to be a method in order to overcome drawbacks of the first and second comparative examples.

However, the compilation may fail with a simple method such as the third comparative example. That is, the third comparative example is unrealistic. In a certain aspect, one of the objects of various embodiments intends to avoid the failure as in, for example, the third comparative example.

In fact, a type of compiler which generates the object code containing the RO sections illustrated in FIG. 3 and FIG. 4 has excellent advantages. Specifically, the type of compiler has an effect that the "time taken to compile the source file is reduced by simplifying the compilation process." Details of the effect will be described later.

However, it is difficult to overcome the disadvantages of the first and second comparative examples without changing (e.g., while maintaining the effect of time reduction) the compilation scheme which achieves the effect of time reduction. The third comparative example is an example in which overcoming (or avoiding) the difficulty fails.

Figure 5:
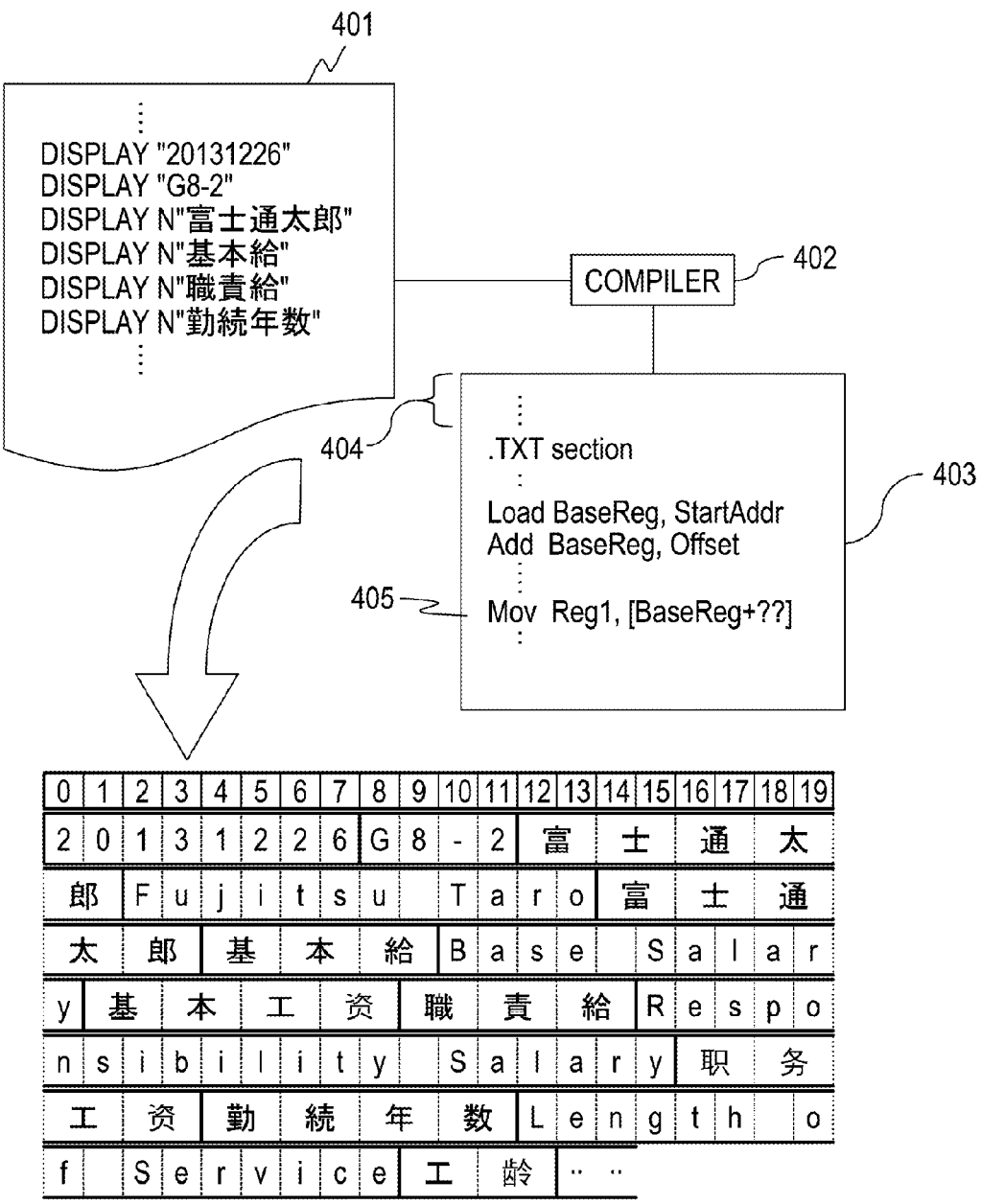
FIG. 5 is a diagram for explaining a third comparative example.

In FIG. 5, a source file 401 which is the same as the source file 301 of FIG. 3 is illustrated. Further, a compiler 402 and an object file 403 are illustrated, and details of an RO section 404 within the object file 403 are also illustrated in FIG. 5.

One of the objects of the third comparative example is to avoid a situation where the plurality of resource files 204, 205, and 206 are used at the time of execution as in the first comparative example and also avoid another situation where a plurality types of object files 303, 320, and 330 are generated as in the second comparative example. A method which may be considered to achieve the aim is to insert the string literals of the plurality of languages in the single RO section 404 of the object file 403.

In FIG. 5, the RO section 404 which contains all of the language independent string literals, the string literals of the Japanese language, the string literals of the English language, and the string literals of the Chinese language, is illustrated. Specifically, the RO section 404 may be considered in which the string literals described above are placed as follows.

Byte 0 to Byte 7: "20131226" (language independent string literal)

Byte 8 to Byte 11: "G8-2" (language independent string literal)

Byte 12 to Byte 21: "富士通太郎" (string literal of the Japanese language)

Byte 22 to Byte 3: "Fujitsu Taro" (string literal of the English language having meanings corresponding to string literal placed in byte 12 to byte 21)

Byte 34 to Byte 43: "富士通太郎" (string literal of the Chinese language having meanings corresponding to string literal placed in byte 12 to byte 21)

Byte 44 to Byte 49: "基本給" (string literal of the Japanese language)

Byte 50 to Byte 60: "Base Salary" (string literal of the English language having meanings corresponding to string literal placed in byte 44 to byte 49)

Byte 61 to Byte 68: "基本工资" (string literal of the Chinese language having meanings corresponding to string literal placed in byte 44 to byte 49)

Byte 69 to Byte 74: "職責給" (string literal of the Japanese language)

Byte 75 to Byte 79: "Responsibility Salary" (string literal of the English language having meanings corresponding to string literal placed in byte 69 to byte 74)

Byte 96 to Byte 103: "职务工资" (string literal of the Chinese language having meanings corresponding to string literal placed in byte 69 to byte 74)

Byte 104 to Byte 111: "勤続年数" (string literal of the Japanese language)

Byte 112 to Byte 128: "Length of Service" (string literal of the English language having meanings corresponding to string literal placed in byte 104 to byte 111)

Byte 129 to Byte 132: "工龄" (string literal of the Chinese language having meanings corresponding to string literal placed in byte 104 to byte 111)

When it is possible for the compiler 402 to generate the object file 403 containing the RO section 404 as described above, the third comparative example will be more advantageous than the first and second comparative examples. However, it does not mean that it is sufficient as long as the object file 403 simply contains the RO section 404 as illustrated in FIG. 5. When the compiler 402 is unable to generate a suitable instruction for referring to the string literal within the RO section 404, the RO section 404 as illustrated in FIG. 5 signifies nothing.

Also, a trial to enable "generation of the object file 403 containing the RO section 404 by modifying the compiler having the effect of time reduction as described above" fails. That is, the method considered in the third comparative example leads nothing but to the failure of compilation.

This is because the suitable instruction for referring to the string literals within the RO section 404 is not determined at the time of compilation. The failure is represented by an instruction 405 for which an operand is not determined in FIG. 5. In the following, descriptions will be made more specifically.

As described above, when the compilation process is simplified, it becomes possible to reduce the time required for compiling the source file. The simplification of the compilation process means that the compiler (e.g., the compiler 302 or 402) performs uniform operations regardless of the type of literal in the order in which the literals appear in the source file (e.g., the source file 301 or 401). Hereinafter, descriptions will be made on the effect of time reduction using the compiler 302 and the source file 301 of the second comparative.

Specifically, the compiler 302 simply translates the literal in the order in which the literals appear in the source file 301 regardless of the type of literal. Also, the compiler 302 consecutively places the literals in the RO section 306 of the object file 303 in the order in which the literals are translated.

That is, the compiler 302 does not change the order in which the literals are translated based on the type of the literal (e.g., a numeric value literal, a language independent string literal, and a language dependent string literal). The compiler 302 just translates the literals in the order in which the literals appear in the source file 301.

Further, the compiler 302 also does not determine a location where the literal is placed within the RO section 306 (in other words, a start address of each literal within the RO section 306) based on the type of the literal. The compiler 302 simply places the literals in the RO section 306 consecutively in the order in which the literals appear in the source file 301.

For example, it is assumed that 10 (ten) literals are contained in the source file 301 and among the literals, a first literal and a seventh literal are numeric value literals, a second literal and a ninth literal are language independent string literals, and a third literal to a sixth literal, an eighth literal, and a tenth literal are language dependent string literals. Even in this case, the translation order is not replaced with, for example, a translation order in which "two numeric value literals are translated at a first operation and a second operation, two language independent string literals are interpreted at a third operation and a fourth operation, and six language dependent string literals are interpreted at sixth operation to a tenth operation". Further, even in this case, the placement of literals based on the type of literals, such as, the placement in which "two numeric value literals are placed at a first operation and a second operation, two language independent string literals are placed at a third operation and a fourth operation, and six language dependent string literals are placed at sixth operation to a tenth operation" is not performed. In such a case, the compiler 302 simply translates an ith literal which appears in the source file 301 at the ith operation and places the ith literal in the RO section 306 at the ith operation ($1 \leq i \leq 10$).

According to the method that "the compiler 302 simply translates the literals sequentially and places the literals in the RO section 306 sequentially based only on the order in which the literals appear in the source file 301 without considering the type of literal" described above, the compilation process is simplified. This is because the process of determining the order in which the literals are placed or the address based on the type of literal becomes unnecessary. Also, the time taken to compile is reduced due to simplification of the compilation process.

The compiler 402 of the third comparative example translates the literals in the order in which the literals appear in the source file 401 regardless of the type of literals in order to achieve the effect of time reduction as described above. Also, the compiler 402 intends to place the literals in the RO section 404 in the sequence of literals having been translated.

More specifically, when the literal which appears at the ith in the source file 401 is the type of language independent literal, the compiler 402 simply places the ith literal in a next location, which is a location after the previous literal is placed, in the RO section 404. In contrast, when the ith literal is the language dependent string literal, the compiler 402 places the ith literal in a next location, which is a location after the previous literal is placed, in the RO section 404 and also places the string literal of other language corresponding to the ith literal consecutively after the location of the ith literal. By doing this, the compiler 402 is able to place a plurality of literals including the literals corresponding with each other between the plurality of languages in the RO section 404 as illustrated in FIG. 5.

In the meantime, the fact that the literals are simply placed in the RO section 404 signifies nothing. The matters that an instruction for accessing the literal (e.g., for referring to the literal within the RO section 404) is contained in the object file 403 allows the literal within RO section 404 to be qualified. However, the compiler 402 of the third comparative example is not able to skillfully determine the instruction for referring to the literal.

The fact that the compiler 402 fails to generate the instruction for referring to the literal is represented by the instruction 405 in which an operand is not defined in FIG. 5. The instruction 405 for which an operand is not definitely designated is also an instruction which is not defined and is non-executable.

The cause of failure of the compilation process in the third comparative example may be understood more easily by comparing the second comparative example with the third comparative example.

In the second comparative example, a string literal of a language referenced at the time of execution is uniquely decided at the time of compilation. For example, in a case where the source file targeted for the Japanese language 301 is compiled, the fact that "when the executable file 311 generated from the object file 303 obtained by the compilation is executed, the string literal of the Japanese language is referenced" is decided at the time of compilation. Similarly, in a case where the source file targeted for the English language is compiled, the fact that "the string literal of the English language is referenced at the time of execution" is decided at the time of compilation. Similarly, in a case where the source file targeted for the Chinese language is compiled, the fact that "the string literal of the Chinese language is referenced at the time of execution" is decided at the time of compilation.

Therefore, the compiler 302 of the second comparative example is able to decide an operand (e.g., an operand which contains a numeric value of "34" in the instruction 309) of an instruction for referring to the literal contained in the RO section at the time of compilation. Accordingly, the compiler 302 of the second comparative example may also generate a suitable instruction (e.g., the instruction 309).

For example, the source file 301 contains the string literal of the Japanese language, but does not contain the string literals of other languages, such as the string literal of the English language or the string literal of the Chinese language. Accordingly, the compiler 302 is able to decide that "the string literal being referenced at the time of execution is the string literal of the Japanese language that appears in the source file 301" at the time of compiling the source file 301. That is, in the second comparative example, when the compiler 302 compiles the source file 301, a possibility that "the string literals of other languages, such as the string literal of the English language or the string literal of the Chinese language are referenced at an execution time of the executable file 311" is excluded in advance.

Therefore, the compiler 302 is able to decide a suitable operand for referring to the string literal of the Japanese language and generate the instruction which contains the suitable operand. For example, the compiler 302 is able to decide the suitable operand of "[BaseReg+34]" for designating the start address of the string literal of the Japanese language of "勤続年数" in the RO section 306. Specifically, the compiler 302 simply translates the literals in the order in which the literals appear in the source file 301 and adds the byte lengths of the literals sequentially such that the value of "34" being contained in the operand may be decisively obtained. Accordingly, the compiler 302 is able to generate the instruction 309 which contains the operand.

Of course, the compiler 302 is able to decide a suitable operand regarding other respective string literals exemplified in the source file 301 and generate an instruction which contains the operand. Therefore, the respective literals are accurately referenced and displayed on the screen 312 at the time of execution of the executable file 311.

Similarly, the compiler 302 is able to decide that "the string literals being referenced at the time of execution is the string literal of the English language" at the time of compiling the source file targeted for the English language (e.g., the source file described with reference to FIG. 4 which is not illustrated). Therefore, the compiler 302 is able to decide the suitable operand of "[BaseReg+56]" for designating the start address of the string literal of the English language of, for example, "Length of Service", in the RO section 321. Accordingly, the compiler 302 is able to generate the instruction 309 which contains the operand.

Similarly, the compiler 302 is able to decide that "the string literals being referenced at the time of execution is the string literal of the Chinese language" at the time of compiling the source file targeted for the Chinese language. Accordingly, the compiler 302 is able to suitably decide an operand of an instruction 332 and generate the instruction 332.

In the meantime, in the third comparative example, it is uncertain whether which language is adopted in a string literal that is referenced at the time of execution. The indeterminacy described above is the cause of failure in generating an instruction in the third comparative example. Even when the compiler 402 is able to place the string literals of the Japanese language, the English language, and the Chinese language as in the RO section 404 of FIG. 5, the compiler 402 fails to generate the suitable instruction for referring to those string literals.

For example, the compiler 402 is able to place the string literals of three types of languages in the RO section 404 by making the string literals to correspond to the string literal of the Japanese language of "勤続年数" contained in the source file 401.

Byte 104 to Byte 111: the string literal of the Japanese language of "勤続年数"

Byte 112 to Byte 128: the string literal of the English language of "Length of Service"

Byte 129 to Byte 132: the string literal of the Chinese language of "工齢"

However, it is uncertain whether which one of three string literals is referenced at the time of execution in the compiler 402. Accordingly, the compiler 402 is unable to determine whether which one of three instructions is to be generated.

An instruction of "Mov Reg1, [BaseReg+104]" for setting the start address of the string literal of the Japanese language of "勤続年数" in the register Reg1

An instruction of "Mov Reg1, [BaseReg+112]" for setting the start address of the string literal of the English language of "Length of Service" in the register Reg1

An instruction of "Mov Reg1, [BaseReg+129]" for setting the start address of the string literal of the Chinese language of "工龄" in the register Reg1

As will be known from the examples described above, in the third comparative example, even when the compiler 402 is able to place the string literals of the Japanese language, the English language, and the Chinese language in the RO section 404 as illustrated in FIG. 5, the compiler 402 is unable to determine the operand of the instruction. As a result, in the third comparative example, the compiler 402 fails to generate a valid instruction for referring to the string literal. That is, in an approach such as the third comparative example, generation of the object code containing the valid instruction for referring to the string literal fails.

Accordingly, it is advantageous to take an approach other than the third comparative example in order to overcome disadvantages of the first comparative example and the second comparative example. In the first embodiment described above and the various embodiments which will be described below, since an approach other than the third comparative example is taken, the failure occurring as in the third comparative example may be avoided. Further, according to the first embodiment described above and the various embodiments which will be described below, the disadvantages of the first and second comparative examples are overcome and the same effect of time reduction described regarding the second and third comparative examples is obtained. Effects of various embodiments including the first embodiment will be described later again.

Figure 6:
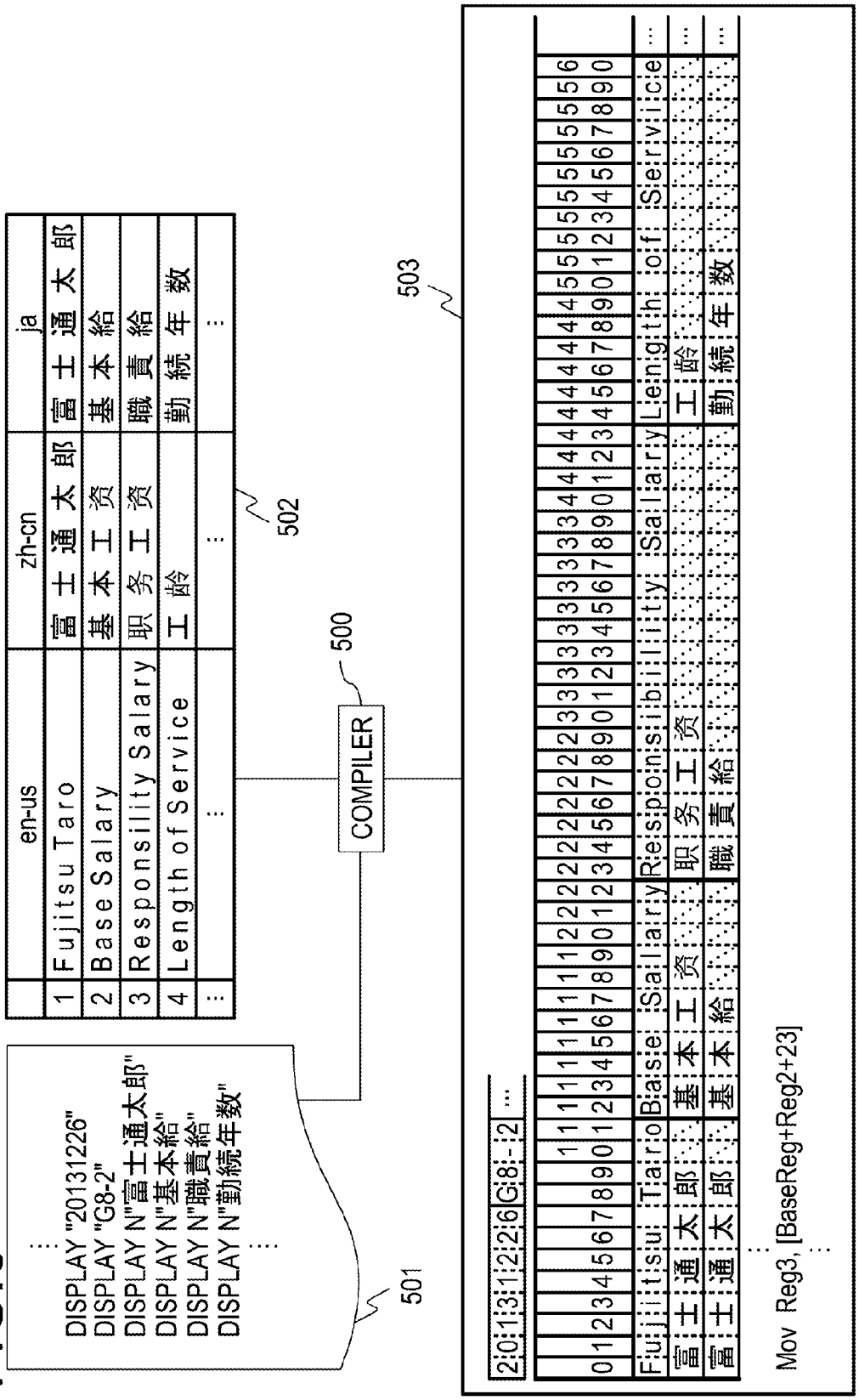
FIG. 6 is a diagram for explaining a summary of a second embodiment.

Descriptions will now be made on a second embodiment with reference to FIG. 6 to FIG. 13. FIG. 6 is a diagram for explaining a summary of a second embodiment. FIG. 6 illustrates a compiler 500, a source file 501 and a locale resource file 502 that are received by the compiler 500 as inputs, and an object file 503 output by the compiler 500 according to the second embodiment. Details of the compiler 500 will be described later.

The source file 501 is the same as the source file 301 of FIG. 3 and the source file 401 of FIG. 5. Specifically, the language independent string literals of "20131226" and "G8-2", the string literals of the Japanese language of "富士通太郎", "基本給", "職責給", and "勤続年数" are contained in the source file 501.

A plurality of tuples of string literals that correspond to the plurality of locales are stored in the locale resource file 502. Specifically, the locale resource file 502 of FIG. 6 corresponds to three types of locales identified by three locale names of "en-us", "zh-cn", and "ja". In other words, the literal tuples which are combinations of the string literals of three types of languages corresponding to three types of locales are defined in the locale resource file 502.

Further, the locale name of "en-us" indicates the English language used in the United States and corresponds to an LCID (locale identifier) indicated by hexadecimal of "0x0409". Further, the "zh-cn" indicates the Chinese language used in the People's Republic of China and corresponds to the LCID indicated by hexadecimal of "0x0804". Also, the "ja" indicates the Japanese language used in Japan and corresponds to the LCID indicated by hexadecimal of "0x0411".

The LCID is an identifier for identifying the locale used in the Windows (registered trademark) OS. API for acquiring the LCID is also provided.

In the following, for convenience of explanation, it is assumed that the locale is identified by the LCID, but a similar identifier for identifying the locale is also used in an OS other than the Windows (registered trademark) OS. Accordingly, the second embodiment may be applied to an OS regardless of an OS in a development environment or an OS in an execution environment.

A data format of the locale resource file 502 may be suitably defined according to the embodiment. In FIG. 6, for convenience, the locale resource file 502 is represented in a table format.

The names of locales corresponding to the languages that the string literal are defined in the locale resource file 502 are recorded in a header of the locale resource file 502. In the example of FIG. 6, three locale names of "en-us", "zh-cn", and "ja" are designated in the header. The LCID may be designated in the header instead of the locale name.

Each record of the locale resource file 502 corresponds to the tuple of the string literal. The identifier (e.g., an identification number in the example of FIG. 6) is allocated to each record.

For example, the record allocated with an identification number of "1" contains the string literal of the English language of "Fujitsu Taro", the string literal of the Chinese language of "富士通太郎", and the string literal of the Japanese language of "富士通太郎". These three string literals have meanings that correspond to each other.

Further, the record allocated with an identification number of "2" contains the string literal of the English language of "Base Salary", the string literal of the Chinese language of "基本工资", and the string literal of the Japanese language of "基本給". These three string literals have meanings that correspond to each other.

Also, the record allocated with an identification number of "3" contains the string literal of the English language of "Responsibility Salary", the string literal of the Chinese language of "职务工资" and the string literal of the Japanese language of "職責給". These three string literals have meanings that correspond to each other.

Further, the record allocated with an identification number of "4" contains the string literal of the English language of "Length of Service", the string literal of the Chinese language of "工龄" and the string literal of the Japanese language of "勤続年数". These three string literals have meanings that correspond to each other.

Further, the locale resource file 502 may be physically a set of a plurality of files according to the embodiment. For example, the locale resource file 502 may be a set of the following three files.

A file corresponding to the locale name of "en-us" (specifically, a file which contains the tuple consisting of the string literal of the English language and the identification number).

A file corresponding to the locale name of "zh-cn" (specifically, a file which contains the tuple consisting of the string literal of the Chinese language and the identification number)

A file corresponding to the locale name of "ja" (specifically, a file which contains the tuple consisting of the string literal of the Japanese language and the identification number)

Further, the character encoding schemes (CES) of the plurality of files may be different from each other. For example, a shift JIS (Japanese industrial standard) may be used in the file corresponding to the locale name of "ja" and the CES other than the shift JIS may be used in other two files.

In contrast, the CESs of the plurality of file may be the same. For example, UTF-8 (UCS transformation format 8, where UCS is an abbreviation of universal multiple-octet coded character set) may be used in the plurality of files.

Otherwise, a separate CES for each locale may be used in a single locale resource file 502. The number of bytes corresponding to a single character may differ depending on the CES (for example, a character represented by 2 bytes in the shift JIS may be represented by 3 bytes in the UTF-8).

The object file 503 contains an RO section in which the string literals are placed and a plurality of instructions. The RO section contains a portion for the language independent string literals and a portion for the language dependent string literals. On account of a paper space, only the RO section and a single instruction are illustrated in FIG. 6. Details of the plurality of instructions contained in the object file 503 will be described later with reference to FIG. 10 and FIG. 11. The instruction illustrated in FIG. 6 is an instruction 837 of FIG. 11.

The string literals that are commonly used regardless of the locale are placed in the section for the language independent string literals of the RO section of the object file 503 in the order in which the string literals appear in the source file 501.

Specifically, the language independent string literal of "20131226" appears first and thereafter, the language independent string literal of "G8-2" appears in the source file 501. Accordingly, the string literal of "20131226" is placed in byte 0 to byte 7 and the string literal of "G8-2" is placed in byte 8 to byte 11 in the section for the language independent string literals within the object file 503.

In the following, for convenience of explanation, a total byte length of the language independent string literals contained in the source file 501 is denoted by "X bytes". Accordingly, the length of the section in which the language independent string literals are placed in the RO section of the object file 503 is "X bytes".

Further, in the second embodiment, the byte length of the longest string literal of three string literals that belong to each literal tuple defined in the locale resource file 502 is used as the "calculation byte length" (see, e.g., descriptions on the first embodiment) that corresponds to the corresponding literal tuple. In the following, for convenience of explanation, a total calculation byte length of all the literal tuples defined in the locale resource file 502 by being corresponded to the string literals that appear in the source file 501 is denoted by "Y bytes".

Accordingly, the length of the section in which the language dependent string literals are placed is "3Y bytes". According to notation of FIG. 1, N=3, and Y=B1+ . . . +BM in FIG. 6.

In the following, for convenience of explanation, it is assumed that the start address of the RO section is counted from not "byte 1", but "byte 0". Accordingly, the language dependent string literals are placed in a range spanning from byte "X" to byte "(X+3Y−1)" of the RO section of the object file 503.

Specifically, as will be described below, the string literals of the English language are placed in the range spanning from byte "X" to byte "(X+Y−1)". Further, in the second embodiment, the string literal having the length shorter than the calculation byte length is padded with space characters (details of which will be described later) and placed in the RO section. In the example of FIG. 6, since each string literal of the English language has the same length as the corresponding calculation byte length, each string literal of the English language is not padded with the space character.

Byte "(X+0)" to Byte "(X+11)": "Fujitsu Taro"
Byte "(X+12)" to Byte "(X+22)": "Base Salary"
Byte "(X+23)" to Byte "(X+43)": "Responsibility Salary"
Byte "(X+44)" to Byte "(X+60)": "Length of Service"

As will be described below, the string literals of the Chinese language are placed in the range spanning from byte "X+Y" to byte "(X+2Y−1)". Further, for convenience of illustration, in FIG. 6 and FIG. 14 which will be described later FIG. 14, the slanted-dotted lines are drawn in the cells which represent the bytes padded with the space characters.

Byte "(X+Y+0)" to Byte "(X+Y+11)": " 富士通太郎 "
Byte "(X+Y+12)" to Byte "(X+Y+22)": " 基本工资 "
Byte "(X+Y+23)" to Byte "(X+Y+43)": " 职务工资 "
Byte "(X+Y+44)" to Byte "(X+Y+60)": " 工龄 "

Further, as will be described below, the string literals of the Japanese language are placed in the range spanning from byte "(X+2Y)" to byte "(X+3Y−1)".

Byte "(X+2+0)" to Byte "(X+2Y+11)": " 富士通太郎 "
Byte "(X+2Y+12)" to Byte "(X+2Y+22)": " 基本給 "
Byte "(X+2Y+23)" to Byte "(X+2Y+43)": " 職責給 "
Byte "(X+2Y+44)" to Byte "(X+2Y+60)": " 勤続年数 "

For example, the string literals placed in the ranges spanning from byte "(X+23)" to byte "(X+43)", byte "(X+Y+23)" to byte "(X+Y+43)", and byte "(X+2+23)" to byte "(X+2Y+43) correspond to the string literal of the Japanese language of " 職責給 " that appears in the source file 501. One thing in common between the start addresses of byte "(X+23)", byte "(X+Y+23)", and byte "(X+2Y+23)" of the string literals of three languages is an offset of "23". The reason the offset is common is because the same number of calculation bytes is allocated to three string literals that belong to each literal tuple.

In FIG. 6, an instruction for which an operand (that is, an operand of "[BaseReg+Reg2+23]") which contains the common offset is designated is illustrated. In particular, as will be described below, the value according to the locale in execution is set in the register Reg2. Accordingly, the start address of the string literal of a suitable language (that is, the English language, the Chinese language, or the Japanese language) according to the locale in execution is referenced according to a common instruction of "Mov Reg3, [BaseReg+Reg2+23]". Unlike the third comparative example where the operand is not defined, since the compiler 500 of the second embodiment is able to decide the value of "23" at the time of compilation, the compiler 500 is able to generate the suitable instruction as described above.

Further, a possibility that "other one or more string literals that are language dependent or language independent are also contained in the source file 501" is represented by omission symbols, that is, dots arranged vertically in FIG. 6. However, when other string literals that are not explicitly represented in FIG. 6 are not contained in the source file 501, X=8+4=12 and Y=12+11+21+17=61.

Figure 7:
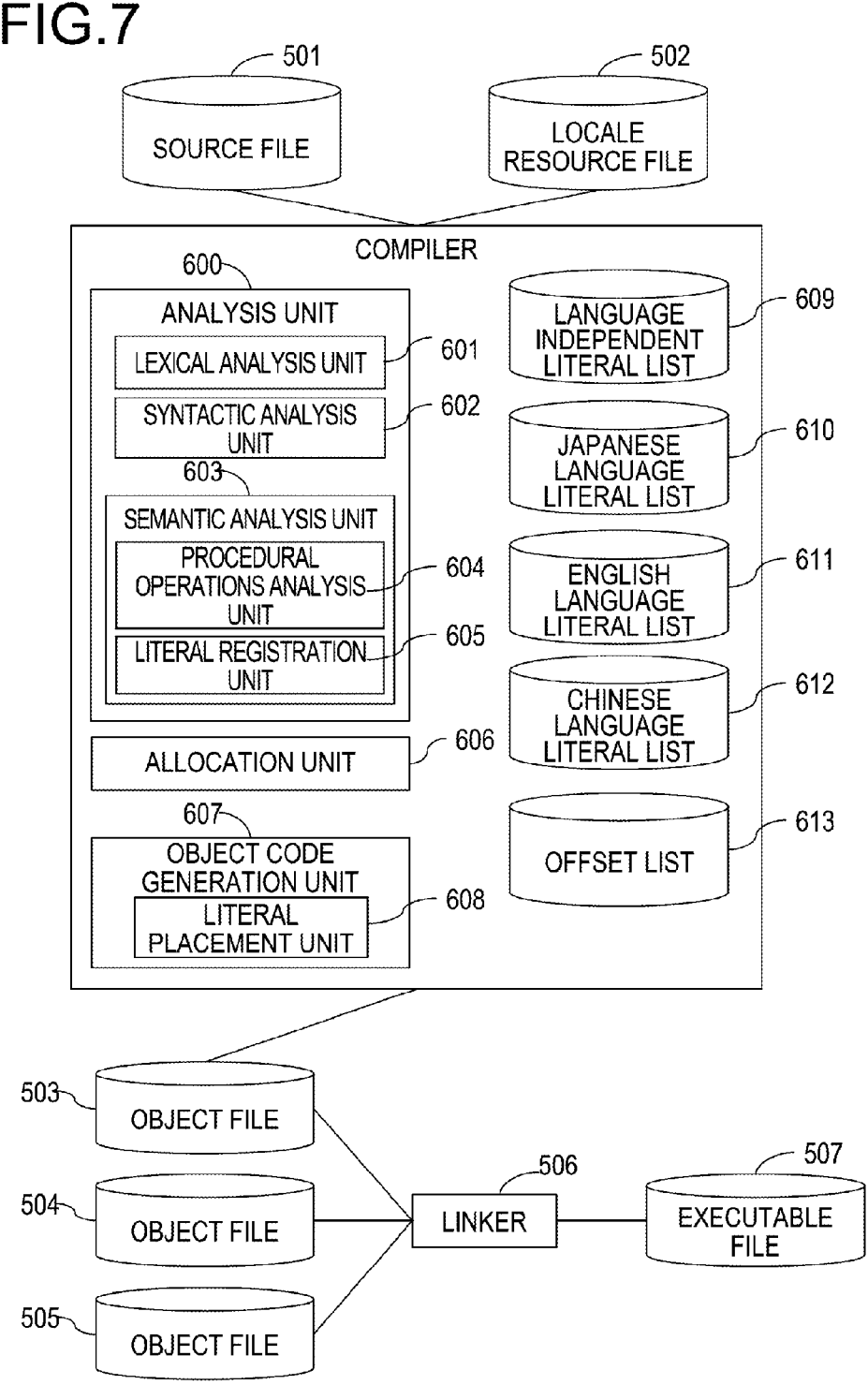
FIG. 7 is a block diagram illustrating a configuration of a compiler according to the second embodiment.

FIG. 7 is a block diagram illustrating a configuration of a compiler according to the second embodiment. In FIG. 7, the compiler 500, the source file 501 and the locale resource file 502 that are received by the compiler 500 as inputs are illustrated. Further, the object file 503 output by the compiler 500, other object files 504 and 505, a linker 506, and an executable file 507 are also illustrated in FIG. 7

Details of the source file 501 and the locale resource file 502 may be the same as, for example, those illustrated in FIG. 6. Further, details of the object file 503 may be the same as, for example, that illustrated in FIG. 6 and those illustrated in FIG. 10 and FIG. 11 which will be described later. The linker 506 links the object files 503, 504 and 505 to generate the executable file 507.

The compiler 500 includes an analysis unit 600. The analysis unit 600 includes a lexical analysis unit 601, a syntactic analysis unit 602, and a semantic analysis unit 603. The semantic analysis unit 603 includes a procedural operations analysis unit 604 and a literal registration unit 605. The compiler 500 further includes an allocation unit 606 and an object code generation unit 607. The object code generation unit 607 includes a literal placement unit 608. The object code generation unit 607 may include a code optimization unit which is not illustrated.

Further, in FIG. 7, temporal data that are prepared and used by the compiler 500 during execution of the compilation process by the compiler 500 are illustrated. Specifically, the compiler 500 prepares and uses a language independent literal list 609. Further, as illustrated in FIG. 6, when the string literals of the English language, the Chinese language, and the Japanese language are defined in the locale resource file 502, the compiler 500 prepares and uses a Japanese language literal list 610, an English language literal list 611, and a Chinese language literal list 612. Further, in particular, as will be described below, the compiler 500 also prepares and uses an offset list 613. Further, specific example of the lists illustrated in FIG. 7 will be described later with reference to FIG. 9.

Details of operations of the compiler 500 will be described later with reference to FIG. 12 and FIG. 13, but the summary thereof is as follows.

The lexical analysis unit 601 scans and analyzes the source code written in the source file 501. That is, the lexical analysis unit 601 recognizes a token string from the character string of the source code.

The syntactic analysis unit 602 parses the token string and generates a parse tree according to the parsing of the token string.

The semantic analysis unit 603 traverses the parse tree and analyzes the meaning of the parse tree. Specifically, the semantic analysis unit 603 prepares a list of symbols (e.g., names such as variable, constant, or function) that appear in the source file 501 or a list of the literals. Further, the semantic analysis unit 603 may perform a consistency check such as a type check. As described above, since the analysis performed by the semantic analysis unit 603 contains plural kinds of processes, the semantic analysis unit 603 may contain a plurality of modules. In FIG. 7, two (e.g., the procedural operations analysis unit 604 and the literal registration unit 605) of the plurality of modules are illustrated.

The procedural operations analysis unit 604 may analyze statements of the source code sequentially. For example, the procedural operations analysis unit 604 may traverse the parse tree in a suitable order (e.g., post-order). Accordingly, the procedural operations analysis unit 604 may analyze, for example, a nest structure between statements or a relationship between a caller which calls a function and the function called by the caller.

The literal registration unit 605 registers the literal that appears in the source code in a suitable literal list. Further, the literal registration unit 605 also registers an offset in the offset list 613 at the time of registering the literal in the literal list.

The allocation unit 606 performs an allocation of the register (e.g., determines as to whether which register is to be used for which instruction). Further, the allocation unit 606 also determines the number of bytes of each section (e.g., the RO section for storing the literals or the section for storing the sequence of instructions) within the object code.

Also, the object code generation unit 607 generates the object code based on results of the processes performed by the semantic analysis unit 603 and the allocation unit 606. The object code generation unit 607 outputs the generated object code as the object file 503. Further, the literal placement unit 608 performs a process of placing the literal in the RO section of the object code during generation of the object code.

In the meantime, the compilers 500 of FIG. 6 and FIG. 7 may be an apparatus, specifically, a compile apparatus implemented by a computer which executes a compiler program. Specifically, the compile apparatus is an apparatus which includes a generation unit (e.g., the object code generation unit 607) which generates the object file 503 based on the source file 501 to be compiled and the locale resource file 502 which defines the literal tuple.

Each unit such as the analysis unit 600 or the object code generation unit 607 within the compiler 500 may be implemented by executing a program module contained in the compiler program by the computer. The computer which executes the compiler program may be a computer 700 of FIG. 8. Further, the compiler program is also referred to simply as a compiler.

Figure 8:
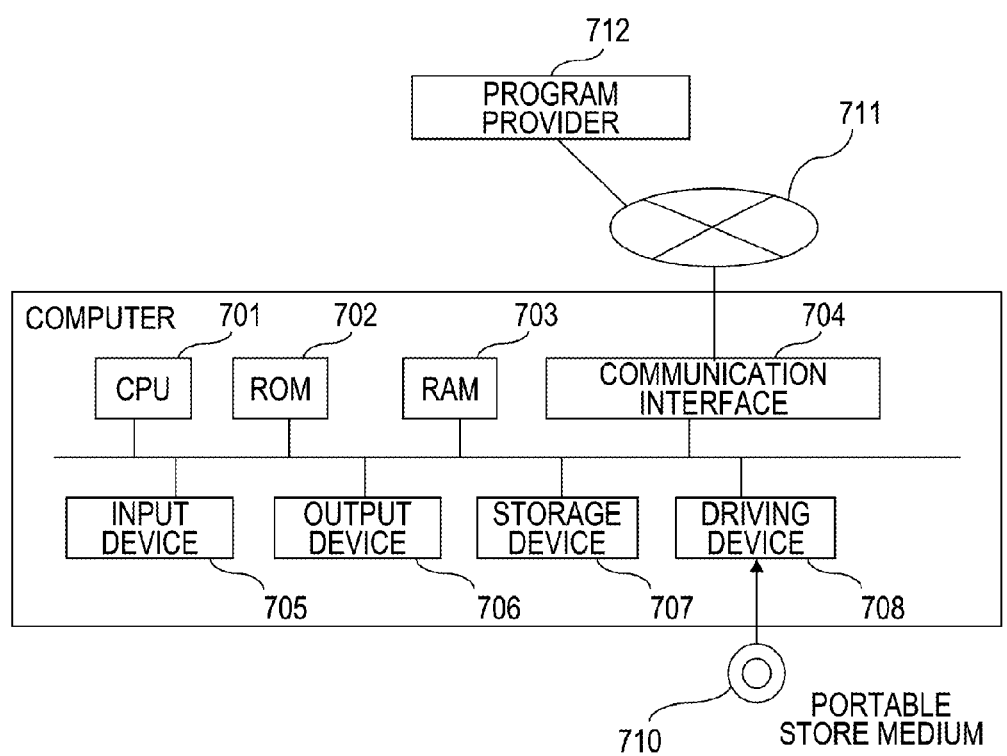
FIG. 8 is a diagram illustrating a hardware configuration of a computer.

FIG. 8 is a diagram illustrating a hardware configuration of the computer 700. The computer 700 includes a CPU (Central Processing Unit) 701, a ROM (Read-Only Memory) 702, a RAM (Random-Access Memory) 703, and a communication interface 704. The computer 700 further includes an input device 705, an output device 706, a storage device 707, and a driving device 708 of a portable storage medium 710. Respective components within the computer 700 are connected with one another via a bus 709.

Further, the computer 700 is connected to the network 711. The network 711 is, for example, the LAN (Local Area Network), WAN (Wide Area Network), or Internet or a combination thereof. Further, the program provider 712 may be connected to the network 711. The program provider 712 is a computer for providing a program.

Although a single CPU 701 is illustrated in FIG. 7, the computer 700 may be provided with a plurality of CPUs 701. Further, the CPU 701 may be a single core CPU or a multicore CPU. The CPU 701 is an example of a processor.

The CPU 701 loads the program onto the RAM 703 and executes the program while using the RAM 703 as a working area. The ROM 702 may have stored firmware, for example, BIOS (Basic Input Output System), therein.

The communication interface 704 is, for example, a wired LAN interface circuit, a wireless LAN interface circuit, or the combination thereof. The communication interface 704 may be an NIC (Network Interface Card) which may be attached externally or an onboard type network interface controller. For example, the communication interface 704 may include a circuit called a "PHY chip" which performs processing at the physical layer and a circuit called a "MAC chip" which performs processing at the sublayer of the MAC (Media Access Control) layer.

The input device 705 is, for example, a keyboard, a pointing device, a microphone, a camera, or a combination of two or more thereof. The pointing device may be, for example, a mouse, a touch pad, or a touch screen.

The output device 706 may be a display, a speaker, or a combination thereof. The display may be a touch screen.

The storage device 707 is a non-volatile device. Specifically, the storage device 707 is, for example, a HDD (Hard Disk Drive), a SSD (Solid-State Drive) or a combination thereof.

Example of a portable storage medium 710 may include an optical disk such as a CD (Compact Disc) or a DVD (Digital Versatile Disk), an opto-magnetic disk, a magnetic disk, or a semiconductor memory card such as a flash memory. The driving device 708 may be an optical disk driving device, an opto-magnetic driving device, or a magnetic disk driving device. Otherwise, the driving device 708 may be a reader/writer for a memory card.

The compiler program for causing the computer 700 to function as the compiler 500 may be installed in the storage device 707 in advance. Otherwise, the compiler program may be stored in the portable storage medium 710 to be provided and read from the portable storage medium 710 by the driving device 708 to be installed in the storage device 707. Otherwise, the compiler program may be provided by the program provider 712, downloaded to the computer 700 through the network 711 and the communication interface 704, and installed in the storage device 707.

Further, all the ROM 702, the RAM 703, the storage device 707, and the portable storage medium 710 are example of tangible storage medium. Such a tangible storage medium is a non-transitory medium such as signal carrier wave.

When the compiler program is executed such that the computer 700 functions as the compiler 500, the analysis unit 600, the allocation unit 606, and the object code generation unit 607 are implemented by the CPU 701. Further, the language independent literal list 609, the Japanese language literal list 610, the English language literal list 611, the Chinese language literal list 612, and the offset list 613 may be stored in the RAM 703, but may also be stored in the storage device 707.

Further, the source file 501 and the locale resource file 502 may be stored in, for example, the storage device 707, in advance. The compiler 500 may output the object file 503 to the storage device 707. The object files 504 and 505 may also be stored in the storage device 707.

The linker 506 is also implemented by causing the program to be executed by the CPU 701. The linker 506 may output the executable file 507 to the storage device 707. The executable file 507 may be executed on the computer 700, otherwise may be copied to other computer (for example, computer of an end user) to be executed.

In the meantime, FIG. 9 is a table in which data used in the second embodiment is illustrated. In FIG. 9, various lists for a case where the source file 501 and the locale resource file 502 illustrated in FIG. 6 are received by the compiler 500 as inputs are illustrated.

Specifically, each record of the language independent literal list 609 includes six fields of "ID (identifier)", "record length", "category", "length", "offset", and "value". The "ID" is an identifier allocated to the record. The "record length" indicates the length of record (e.g., a total of lengths of six fields).

The language independent literal is stored in the "value" field. The "category" indicates a type of literal. In the example of FIG. 9, a category of a numerical literal is represented by "1", a category of a common alphanumeric literal used without being dependent on the language is represented by "2", and a category of the language dependent string literal is represented by "3".

The byte length of the literal stored in the "value" field is stored in the "length" field. Further, a total of values stored in "length" fields of the first record to the (i−1)th record is stored in the "offset" field of the ith record (1<i). The "offset" of the ith record is 0 (zero).

In FIG. 9, an example in which the byte lengths of the fields for "ID", "record length", "category", "length", and "offset" are 6-byte, 2-byte, 2-byte, 2-byte, and 2-byte, respectively, is illustrated.

Since the value of the first record is an 8-byte numeric value literal of "20131226", the record length, the category, and the length for the first record are 22, 1, and 8, respectively. Further, an ID of "A00001" is allocated to the first record.

Since the value of the second record is a 4-byte numeric value literal of "B8-2", the record length, the category, and the length for the second record are 18, 2, and 4, respectively. Further, an ID of "A00002" is allocated to the second record. The offset of the second record is 8.

The string literal of the Japanese language stored in the locale resource file 502 is registered in the Japanese language literal list 610. Each record of the Japanese language literal list 610 includes four fields of "ID", "record length", "category", and "value".

In FIG. 9, an example in which the byte lengths of the fields for "ID", "record length", and "category" are 6-byte, 2-byte, and 2-byte, respectively, is illustrated. The category of each record is also "3" in the Japanese language literal list 610.

In the example of FIG. 9, the IDs of "B00001", "B00002", "B00003", and "B00004" are allocated in the first to the fourth records of the Japanese language literal list 610, respectively. Further, the string literals of the Japanese language of "富士通太郎", "基本給", "職責給", and "勤続年数" are stored in the value fields of the first to the fourth records, respectively. The byte lengths of these four string literals are 10-byte, 6-byte, 6-byte, and 8-byte, respectively. Since the value in the record length field indicates the length of the record (e.g., a total length of four fields), the record length of, for example, the third record is 16=6+2+2+6.

The string literal of the English language stored in the locale resource file 502 is registered in the English language literal list 611. The type of the English language literal list 611 is the same as that of the Japanese language literal list 610. The category of each record is also "3" in the English language literal list 611.

In the example of FIG. 9, the IDs of "C00001", "C00002", "C00003", and "C00004" are allocated in the first to the fourth records of the English language literal list 611, respectively. Further, the string literals of the English language of "Fujitsu Taro", "Base Salary", "Responsibility Salary", and "Length of Service" are stored in the value fields of the first to the fourth records, respectively. The byte lengths of these four string literals are 12-byte, 11-byte, 21-byte, and 17-byte, respectively.

The string literal of the Chinese language stored in the locale resource file 502 is registered in the Chinese language literal list 612. The type of the Chinese language literal list 612 is also the same as that of the Japanese language literal list 610. The category of each record is also "3" in the Chinese language literal list 612.

In the example of FIG. 9, the IDs of "D00001", "D00002", "D00003", and "D00004" are allocated in the first to the fourth records of the Chinese language literal list 612, respectively. Further, the string literals of the Chinese language of "富士通太郎", "基本工资", "职务工资", and "工龄" are stored in the value fields of the first to the fourth records, respectively. The byte lengths of these four string literals are 10-byte, 8-byte, 8-byte, and 4-byte, respectively.

In the meantime, as illustrated and described above, each ID used in the list of the string literal of each language is a combination of a prefix, for example, "B", "C", or "D" according to the language and a suffix, for example, "00002", in the second embodiment. Also, in the second embodiment, suffixes between the IDs of a plurality of string literals having meanings that correspond to each other are identical with each other.

For example, the string literal of the Japanese language identified by the ID of "B00002", the string literal of the English language identified by the ID of "C00002", and the string literal of the Chinese language by the ID of "D00002" are having the meanings that correspond to each other. Further, each of the IDs of these three string literals contains the common suffix of "00002". The suffix of "00002" corresponds to the second string literal among the language dependent string literals that appear in the source file 501.

The suffix as described above is used as an ID which identifies each record of the offset list 613. In addition to the ID, each record of the offset list 613 contains fields of "maximum length" and "offset".

The maximum byte length of the plurality of string literals identified by the ID (e.g., "B00002", "C00002", and "D00002") which contains the ID (for example, "00002") of the offset list 613 as the suffix is stored in the "maximum" field of the offset list 613. The value stored in the "maximum" field is used as the "calculation byte length" described with reference to FIG. 1.

Further, a total value of the "maximum" fields of the records spanning from the first record to the (i−1)th record is stored in the "offset" field of the ith record of the offset list 613 (1<i). The offset of the first record is 0 (zero).

For example, the ID of the first record is "00001". That is, the first record of the offset list 613 is made correspondence with the record which is identified by the ID containing suffixes of "00001" in each of the Japanese language literal list 610, the English language literal list 611, and the Chinese language literal list 612.

The byte lengths of three string literals of three languages identified by the IDs of "B00001", "C00001", and "D00001" are 10-byte, 12-byte, and 10-byte, respectively, as described above. Accordingly, the value of "12" (e.g., the maximum of three values of "10", "12", and "10") is stored in the "maximum length" field of the first record of the offset list 613.

Further, the ID of the second record is "00002". The value of "11" (e.g., the maximum of three values of "6", "11", and "8") is stored in the "maximum length" field of the second record. The value of "12 which is equal to the "maximum length" of the first record is stored in the "offset" field of the second record.

The ID of the third record is "00003". The value of "21" (e.g., the maximum of three values of "6", "21", and "8") is stored in the "maximum length" field of the third record. The value of "23=12+11" which is the total of the values of the "maximum length" fields of the first and the second records is stored in the "offset" field of the third record.

The ID of the fourth record is "00004". The value of "17" (e.g., the maximum of three values of "8", "17", and "4") is stored in the "maximum length" field of the fourth record. The value of "44=12+11+21" which is the total of the values of the "maximum length" fields of the first, the second, and the records is stored in the "offset" field of the fourth record.

The maximum length of the offset list 613 is an example of the "calculation byte length" described with reference to FIG. 1. According to the notation of FIG. 1, four maximum lengths illustrated in FIG. 9 are represented by B1=12, B2=11, B3=21, B4=17.

Further, for convenience of explanation, it is assumed that an offset of the ith record of the offset list 613 is denoted by Oi. The offset list 613 indicates that O1=0, O2=B1=12, O3=B1+B2=23, and O4=B1+B2+B3=44.

Subsequently, descriptions will be made on the sequence of instructions that are contained in the object file 503. The object file 503 contains the RO section in which the string literals are placed as illustrated in FIG. 6. A section for storing the sequence of instructions exists after the RO section. FIG. 10 and FIG. 11 are views the sequence of instructions generated in the second embodiment.

Further, actually, respective instructions contained in the object file 503 are machine language instructions contained in a predetermined instruction set. However, in order to help understanding, an assembly code which corresponds to the machine code is represented in FIG. 10 and FIG. 11. The assembly code is also represented in FIG. 15, which will be described later, similarly as in FIG. 10 and FIG. 11.

The compiler 500 (e.g., the object code generation unit 607) may generate the assembly code illustrated in FIG. 10 and FIG. 11 first and thereafter, may convert the generated assembly code into the machine code. Depending on the embodiments (e.g., depending on a command option assigned to the compiler 500), the compiler 500 may generate an assembly code file instead of the object file 503 written in the machine language.

In FIG. 10, a label 800 of ".TXT Section" indicates that the section for sequence of instructions begins and a label 800 of "Prologue" indicates that the prologue begins. The sequence of instructions for initialization is contained in the prologue.

In the prologue, a portion spanning from a label 802 of "LocaleJudgment" to a label 823 of "EndLocaleJudgment" corresponds to a process of storing the value according to the locale in execution in a register. Details of which are as follows.

The instruction 803 is an LEA (Load Effective Address) instruction for loading an address designated by the second operand onto the register Reg0. In FIG. 10, the second operand represented as "GetLocaleReturnAddr" for convenience is an address which indicates the section in which a return value of an API function for acquiring an LCID is stored.

The instruction 804 indicates a subroutine call which calls the API function for acquiring an LCID. The instruction 805 is executed after the API function is executed.

The instruction 805 is an instruction for loading the value stored in a location of the address (that is, address represented by "GetLocaleReturnAddr" for convenience in FIG. 10) maintained in the register Reg0 onto the register Reg1. Due to execution of the instruction 805, the value of the LCID in an execution environment is stored in the register Reg1.

In the meantime, the string literals used in three locales that are identified by the locale names of "en-us", "zh-cn", and "ja", respectively, are defined in the locale resource file 502 of FIG. 6. Three labels 806, 811, and 816 that correspond to these three locales are represented in FIG. 10.

In FIG. 10, subsequent to the label 806 of "English", the instructions 807, 808, 809, and 810 for a process of "checking whether the LCID in execution is equal to the value of "0x0409" and setting 0 (zero) in the register Reg2 when both are equal to each other" are placed. The "0x0409" is the LCID which corresponds to the locale name of the "en-us".

The instruction 807 is an instruction for comparing the value of the register Reg1 (e.g., LCID in execution) with the value of "0x0409". The next instruction 808 is a conditional branch instruction (e.g., conditional jump instruction) for jumping to the label 811 of "Chinese" when the two values that are compared by the instruction 807 are not equal to each other.

When the value of the register Reg1 is equal to the value of "0x0409", the instruction 809 is executed. The instruction 809 is an instruction for setting the value of 0 (zero) in the register Reg2. The instruction 810 placed after the instruction 809 is an unconditional branch instruction (e.g., unconditional jump instruction) to jump to the label 823 of "EndLocaleJudgment".

A portion spanning from the label 811 to the instruction 815 is similar to the portion spanning from the label 806 to the instruction 810. Specifically, subsequent to the label 811 of "Chinese", the instruction 812 for comparing the value of the register Reg1 (e.g., the LCID in execution) with the value of "0x0804" (e.g., LCID corresponding to the locale name of "zh-cn") is placed. The next instruction 813 is a conditional branch instruction for jumping to the label 816 of "Japanese" when the two values that are compared by the instruction 812 are not equal to each other.

When the value of the register Reg1 is equal to the value of "0x0804", the instruction 814 is executed. The instruction 814 is an instruction for setting the value of 1 (one) in the register Reg2. The instruction 815 which is placed after the instruction 814 is an unconditional branch instruction which is the same as the instruction 810.

A portion spanning from the label 816 to the instruction 820 is also similar to the portion spanning from the label 806 to the instruction 810. Specifically, subsequent to the label 816 of "Japanese", the instruction 817 for comparing the value of the register Reg1 (e.g., the LCID in execution) with the value of "0x0411" (e.g., LCID corresponding to the locale name of "ja") is placed. The next instruction 818 is a conditional branch instruction for jumping to the label 821 of "Others" when the two values that are compared by the instruction 817 are not equal to each other.

When the value of the register Reg1 is equal to the value of "0x0411", the instruction 819 is executed. The instruction 819 is an instruction for setting the value of 2 (two) in the register Reg2. The instruction 820 which is placed after the instruction 819 is an unconditional branch instruction which is the same as the instruction 810.

A default operation for a case where the LCID in execution is not equal to any value of "0x0409", "0x0804", and "0x0411" is designated after the instruction 820. Specifically, subsequent to the label 821 of "Others", the instruction 822 for setting the value of 0 (zero) in the register Reg2 is placed. The instruction 822 is the same as the instruction 809.

That is, according to the instruction 822, when the LCID in execution is not equal to any one of "0x0409", "0x0804", and "0x0411", the string literal of the English language is used. The reason the object code generation unit 607 generates the instruction 822 described above is because the Latin alphabet used in the English language is able to be used in any environment. That is, the compiler 500 of the second embodiment determines that the default language is the English language and the object code generation unit 607 generates an instruction based on the determination.

The label 823 of "EndLocaleJudgment" is placed after the instruction 822. As will be seen from the above descriptions, when the locale which is represented as the jth locale in the header row of the locale resource file 502 is identical with the locale in the execution environment, the value of "(j−1)" is set in the register Reg2 (1≤j). Further, when the locale in the execution environment is not identical with any of locales represented in the header row of the locale resource file 502, the default value is set in the register Reg2. The default value in the second embodiment is the value for the locale which uses the English language (that is, 0).

The label 824 of "StartProcedure" which indicates that the procedural operation begins is placed after the prologue. In FIG. 11, the instruction 825 to the instruction 844 that correspond to four DISPLAY statements within the source file 501 of FIG. 6 are illustrated.

The instruction 825 is an instruction for multiplying the value stored in the register Reg2 with "Y" (e.g., a total of values stored in the "maximum length" field of the offset list 613) and storing the multiplication result in the register Reg2. The instruction 826 is an instruction for adding the value stored in the register Reg2 and "X" (e.g., a total of values stored in the "length" field of the language independent literal list 609) and storing the addition result in the register Reg2.

Further, the instruction 827 is a load instruction for setting the start address on the memory at the time of execution of the object code stored in the object file 503 in the base register. The start address is represented as "StartAddr" in FIG. 11.

The next instruction 828 is an instruction for adding the value stored in the base register and an offset which extends from the top of the object code to the top of the RO section and storing the addition result in the base register. The values set in the register Reg2 and the base register by the instructions 825, 826, 827, and 828 are used in the instructions 829, 833, 837, and 841.

The instructions 829, 830, 831, and 832 are instructions for displaying the string literals according to the locale in execution which correspond to the first language dependent string literal of "富士通太郎" written in the source file 501.

According to the offset list 613 of FIG. 9, the offset which corresponds to the first language dependent string literal is 0 (zero). Accordingly, the object code generation unit 607 reads the value of 0 (zero) from the "offset" field of the first record of the offset list 613 and generates the instruction 829 using the read value.

The instruction 829 is an instruction for setting a total of the value stored in the base register, the value stored in the register Reg2, and 0 (zero) in the register Reg3.

Here, for convenience of explanation, the value (e.g., the value of "0", "1", or "2" according to the locale in execution) set in the register Reg2 by the instruction 809, 814, 819, or 822 is represented as "r". Further, as described with reference to FIG. 9, the offset Oi, which correspond to the string literal which appears ith within the source file 501 among the language dependent string literals, is 0 for i=1 and (B1+ . . . Bi−1) for 1<i.

Further, for simplification of explanation, the expression of "the string literal which appears ith within the source file 501 among the language dependent string literals" may be simply described as the "ith string literal." The above matters for the simplicity of descriptions are the similarly applied to the third embodiment which will be described later. Further, a literal tuple to which the string literal appearing ith within the source file 501 belongs is defined as the locale resource file 502, and a plurality of string literals written in a plurality of languages belong to the literal tuple. Among the plurality of string literals, the string literal of the language according to the locale in execution may be simply described as the "ith string literal of the language according to the locale in execution." The above matters for the simplicity of descriptions are the similarly applied to the third embodiment which will be described later.

Accordingly, as will be known from FIG. 6, FIG. 9, FIG. 10, and FIG. 11, the start address Ai of the ith string literal of the language according to the locale in execution is represented as Equation (1). Further, the "language according to the locale in execution" is the English language when the LCID in the execution environment is "0x0409", the Chinese language when the LCID in the execution environment is "0x0804", the Japanese language when the LCID in the execution environment is "0x0411", and the default language (e.g., the English language) when the LCID in the execution environment is a value other than the value of "0x0409", "0x0804", and "0x0411"

$$Ai = StartAddr + Offset + X + r \cdot Y + Oi \qquad (1)$$

The instruction 829 is an instruction for calculating the start address A1 of the first string literal of language according to the locale in execution and setting the start address A1 in the register Reg3. That is, the start address A1 is referenced based on the execution result of the instruction 829.

In the following, for convenience of explanation, it is assumed that a subroutine for displaying the string literal on the screen is the following subroutine.

A subroutine which takes a start address and a length of a string to be displayed as two arguments A subroutine which takes a value set in a first predetermined register (hereinafter, referred to as "register DispReg1") as a first argument (that is, an argument indicating the start address of the string literal)

A subroutine which takes a value set in a second predetermined register (hereinafter, referred to as "register DispReg2") as a second argument (that is, an argument indicating the length of the string literal)

Accordingly, the instruction 830 is an instruction for copying the value stored in the register Reg3 to the register DispReg1 and the instruction 831 is an instruction for copying the byte length of "12" to the register DispReg2. The object code generation unit 607 reads the value of "12" from the "maximum length" field of the first record of the offset list 613 and generates the instruction 831 using the read value. The instruction 832 is an instruction for calling the subroutine.

The instructions 833, 834, 835, and 836 are instructions for displaying the string literal according to the locale in execution that corresponds to the second language dependent string literal of " 基本給 " written in the source file 501. For example, the instruction 833 is an instruction for setting the start address A2 of the second string literal according to the locale in execution in the register Reg3 and the start address A2 is referenced based on the execution result of the instruction 833.

The instructions 833, 834, 835, and 836 are similar to the instructions 829, 830, 831, and 832. The only difference between the instructions 833 to 836 and the instructions 829 to 832 is the operand.

Specifically, since the values of the "offset" field and the "maximum length" field of the second record of the offset list 613 are "12" and "11", respectively, the value of "12" is contained in the operand of the instruction 833 and the value of "11" is designated as the operand of the instruction 835. That is, the object code generation unit 607 generates the instructions 833 and 835 based on the second record of the offset list 613.

The instructions 837, 838, 839, and 840 are instructions for displaying the string literal according to the locale in execution that corresponds to the third language dependent string literal of " 職青給 " written in the source file 501. For example, the instruction 837 is an instruction for setting the start address A3 of the third string literal according to the locale in execution in the register Reg3 and the start address A3 is referenced based on the execution result of the instruction 837.

The instructions 837, 838, 839, and 840 are similar to the instructions 829, 830, 831, and 832. The only difference between the instructions 837 to 840 and the instructions 829 to 832 is the operand.

Specifically, since the values of the "offset" field and the "maximum length" field of the third record of the offset list 613 are "23" and "21", respectively, the value of "23" is contained in the operand of the instruction 837 and the value of "21" is designated as the operand of the instruction 839. That is, the object code generation unit 607 generates the instructions 837 and 839 based on the third record of the offset list 613.

The instructions 841, 842, 843, and 844 are instructions for displaying the string literal according to the locale in execution that corresponds to the fourth language dependent string literal of " 勤続年数 " written in the source file 501. For example, the instruction 841 is an instruction for setting the start address A4 of the fourth string literal according to the locale in execution in the register Reg3 and the start address A4 is referenced based on the execution result of the instruction 841.

The instructions 841, 842, 843, and 844 are also similar to the instructions 829, 830, 831, and 832. The only difference between the instructions 841 to 844 and the instructions 829 to 832 is the operand.

Specifically, since the values of the "offset" field and the "maximum length" field of the fourth record of the offset list 613 are "44" and "17", respectively. The value of "44" is contained in the operand of the instruction 841 and the value of "17" is designated as the operand of the instruction 843. That is, the object code generation unit 607 generates the instructions 841 and 843 based on the fourth record of the offset list 613.

As will be seen from FIG. 10 and FIG. 11, according to the second embodiment, the object code generation unit 607 is able to decide the operands of the instructions 829, 833, 837, and 841 (e.g., the start address of the string literal which depends on the locale in execution) at the time of compilation. That is, the problem occurring in the third comparative example that "Since the operand is unable to be decided at the time of compilation, the compilation process fails." does not occur in the second embodiment.

Supplementary explanations about the reason why the problem occurring in the third comparative example is avoided in the second embodiment are as follows. In the second embodiment, the same byte length (e.g., the value of the "maximum length" field of the offset list 613) is allocated to the plurality of string literals that belong to a single literal tuple. As a result, it becomes possible to compute the start address of the string literal according to the locale in execution by using a common value (e.g., the value of "12" in the instruction 833) which does not depend on the locale in execution as an offset. Since the common value is decided at the time of compilation, the problem occurring in the third comparative example is avoided in the second embodiment.

Figure 12:
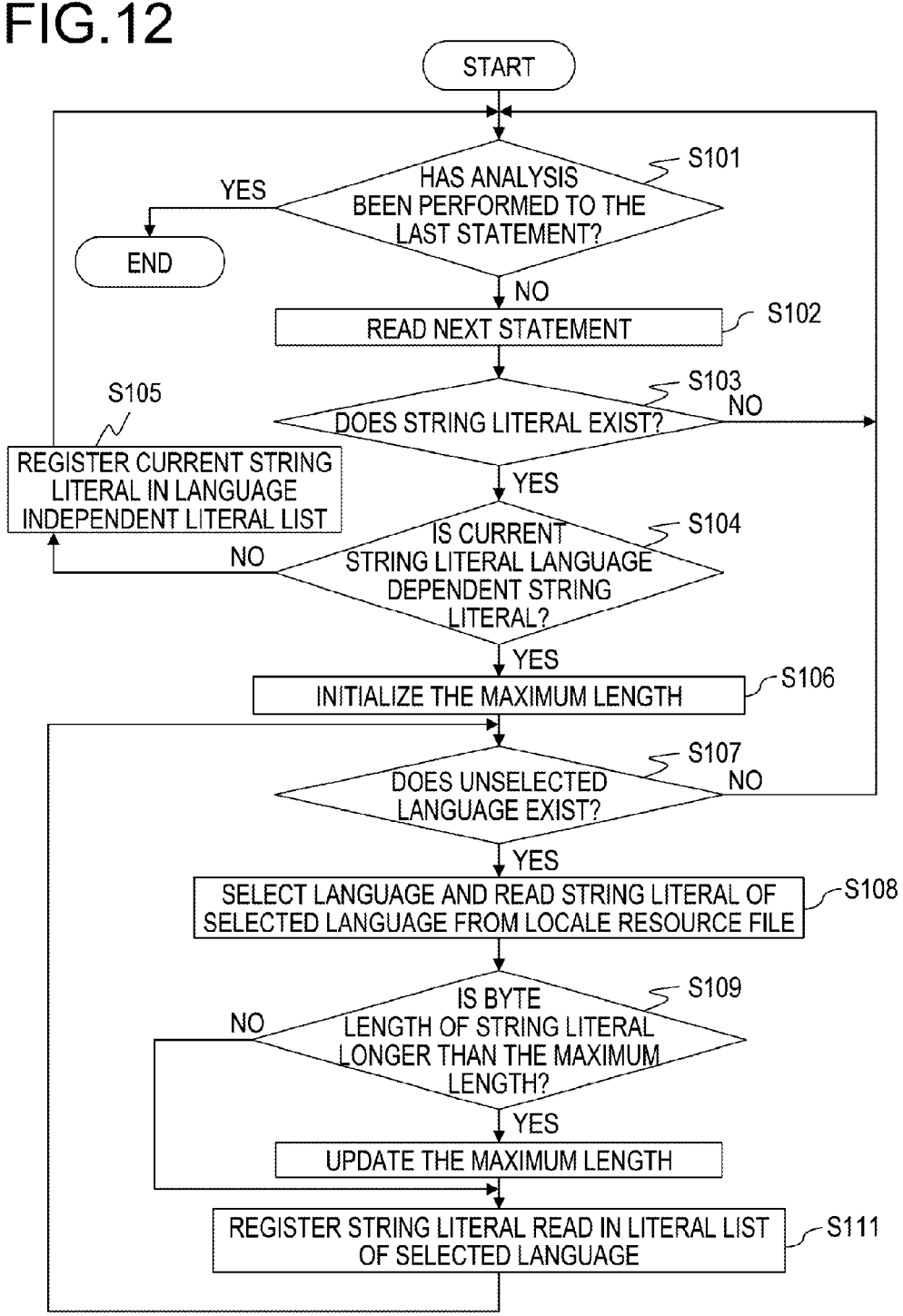
FIG. 12 is a flowchart illustrating a literal list preparation process performed by the compiler of the second embodiment.

In the meantime, FIG. 12 is a flowchart illustrating a literal list preparation process performed by the compiler of the second embodiment. The process of FIG. 12 is executed by the semantic analysis unit 603 after a lexical analysis by the lexical analysis unit 601 and a syntactic analysis by the syntactic analysis unit 602 are completed. For example, when the source file 501 and the locale resource file 502 of FIG. 6 are input, the semantic analysis unit 603 executes the process of FIG. 12 to generate five lists of FIG. 9.

At step S101, the procedural operations analysis unit 604 determines whether the analysis has been performed to the last statement. For example, the procedural operations analysis unit 604 may traverse the parse tree in a post-order. When traversal for the entire parse tree has been completed, the analysis to the last statement has been finished.

When the analysis has been performed to the last statement, the process of FIG. 12 is also completed. In contrast, when an unanalyzed statement remains, the process of FIG. 12 proceeds to step S102.

Also, at step S102, the procedural operations analysis unit 604 reads the next statement (e.g., data of a subtree corresponding to the next statement).

Further, the statements may be nested with each other within the source code. The word of "next" in the expression of "next statement" means "next" in the order in which the parse tree is traversed by the procedural operations analysis unit 604.

At step S103, the procedural operations analysis unit 604 determines whether the string literal exists among the statement read at step S102. When it is determined that the string literal does not exist among the statement read at step S102, the process of FIG. 12 goes back to step S101.

In contrast, when it is determined that the string literal exists among the statement read at step S102, the literal registration unit 605 performs processing of step S104 to step S111. In the following, for convenience of explanation, the string literal of the statement read at step S102 is referred to as the "current string literal".

Specifically, at step S104, the literal registration unit 605 determines whether the current string literal is the language dependent string literal. A specific scheme of determination performed at step S104 may be different depending on the embodiment.

For example, in the example of FIG. 6, the compiler 500 is a COBOL compiler. Also, as illustrated in the source file 501 of FIG. 6, in COBOL, it is possible to indicate that the string literal is the language dependent string literal (e.g., the national literals) by marking the token of "N" ahead of the string literal. Accordingly, the literal registration unit 605 may perform the determination processing of step S104 based on the specification of the programming language (e.g., according to whether the token of "N" is present or not).

Otherwise, the literal registration unit 605 may refer to the locale resource file 502 so as to perform the determination processing of step S104.

For example, it is assumed that the current string literal is the string literal of "G8-2" among the source file 501 of FIG. 6. In this case, the literal registration unit 605 retrieves the string literal of "G8-2" in the Japanese language column of the locale resource file 502. As a retrieval result, since the string literal of "G8-2" is not found, the literal registration unit 605 determines that the string literal of "G8-2" is the language independent string literal".

As a separate example, it is assumed that the current string literal is the string literal of "基本給" among the source file 501 of FIG. 6. In this case, the literal registration unit 605 retrieves the string literal of "基本給" in the Japanese language column of the locale resource file 502. As a retrieval result, since the string literal of "基本給" is found, the literal registration unit 605 determines that the string literal of "基本給" is the language dependent string literal".

Further, the literal registration unit 605 is able to determine whether which language column within the locale resource file 502 is to be retrieved by a suitable method according to the embodiment.

For example, the locale name may be designated as a command option for the compiler 500. In this case, the literal registration unit 605 retrieves the column (e.g., the Japanese language column when "ja" is designated) which corresponds to the designated locale name within the locale resource file 502.

As a separate example, the compiler 500 may acquire the name of the locale in an environment in which the source file 501 is developed through the API provided by an OS. In this case, the literal registration unit 605 retrieves the column (e.g., the Japanese language column when "ja" is acquired) which corresponds to the acquired locale name within the locale resource file 502.

As another example, the compiler 500 (e.g., the lexical analysis unit 601) may analyze the source file 501 so as to determine the character encoding scheme (CES) used in the source file 501. A known analysis scheme for determining the character encoding scheme of the file may be utilized. Further, the compiler 500 may include a correspondence table between a locale name and a character encoding scheme. In this case, the compiler 500 may recognize the locale name, which corresponds to the character encoding scheme recognized by the analysis, based on the correspondence table.

For example, it is assumed that the character encoding scheme utilized in the source file 501 is the shift JIS. Since the shift JIS is the character encoding scheme for the Japanese language, the shift JIS and the locale name of "ja" correspond to each other in the correspondence table. Accordingly, in this case, the literal registration unit 605 retrieves the Japanese language column within the locale resource file 502 according to the locale name of "ja" recognized by the compiler 500 based on the correspondence table.

As described above, there are various specific methods for the determination of step S104. However, at step S104, the literal registration unit 605 determines whether the current string literal is the language dependent string literal.

When it is determined that the current string literal is the language independent string literal, the literal registration unit 605 registers the current string literal in the language independent literal list 609 at step S105. For example, when the current string literal is the string literal of "G8-2", the second record of the language independent literal list 609 of FIG. 9 is newly prepared and added by the literal registration unit 605. The process of FIG. 12 goes back to step S101 after step S105.

In contrast, when it is determined that the current string literal is the language dependent string literal, step S106 to step S111 are executed.

At step S106, the literal registration unit 605 adds a new record to the offset list 613. The literal registration unit 605 allocates a new ID to the added record and initializes the value stored in the maximum length field of the added record to 0 (zero). Further, a suitable value is set in the offset field in a process of FIG. 13 which will be described later. For example, when the current string literal is the string literal of "富士通太郎", the first record is added in the offset list 613.

Next, at step S107, the literal registration unit 605 determines whether an unselected language for the current string literal remains among the languages that string literals are stored in the locale resource file 502.

For example, in the example of FIG. 6, the "languages that the string literals are stored in the locale resource file 502" are three languages, specifically, the English language, the Chinese language, and the Japanese language. Accordingly, the literal registration unit 605 determines whether an unselected language for the current string literal remains among the English language, the Chinese language, and the Japanese language.

When it is determined that the unselected language does not remain (e.g., when all the languages have been selected), the process of FIG. 12 goes back to step S101. In contrast, when the unselected language remains, the process of FIG. 12 goes back to step S108.

At step S108, the literal registration unit 605 selects one of the unselected languages among the languages that the string literals are stored in the locale resource file 502. Also, the literal registration unit 605 reads the string literal, which has the meaning corresponding to the current string literal and is written in the selected language, from the locale resource file 502.

For example, it is assumed that the current string literal is the string literal of " 勤続年数 " among the source file 501. In this case, at step S108, when the English language is selected, the literal registration unit 605 reads "Length of Service", which is the string literal of the English language corresponding to the string literal of " 勤続年数 ", from the locale resource file 502. That is, the literal registration unit 605 reads the string literal of "Length of Service" from the English language field which is contained in the same record as the current string literal.

As a separate example, when the Japanese language is selected at step S108, the literal registration unit 605 may actually omit referring to the locale resource file 502. This is because the " 勤続年数 " itself which is the current string literal is a character string written in the selected language. That is, the literal registration unit 605 may regard the current string literal found out at step S103 as "the string literal read from the locale resource file 502 at step S108".

Also, at step S109, the literal registration unit 605 determines whether the byte length of the string literal read at step S108 is longer than the byte length indicated by the maximum length field of the record added at step S106. When it is determined that the byte length of the read string literal is longer than the byte length indicated by the maximum length field, the process of FIG. 12 proceeds to step S110, and otherwise, the process of FIG. 12 proceeds to step S111.

At step S110, the literal registration unit 605 writes the byte length of the string literal read at step S108 into the maximum length field of the record added at step S106. Accordingly, the literal registration unit 605 suitably updates the maximum length. The process of FIG. 12 proceeds to step S111 after update at step S110.

At step S111, the literal registration unit 605 registers the string literal read at step S108 in the literal list of the language selected at step S108. Details thereof will be described later. The process of FIG. 12 goes back to step S107 after registration at step S111. By a loop process consisting of step S107 to step S111, the string literal of each language having meaning that corresponds to the current string literal is registered in the literal list of each language.

For example, it is assumed that the current string literal found out at step S103 is " 勤続年数 ". In this case, at step S106, the fourth record of the offset list 613 is added. The literal registration unit 605 issues a new ID of "00004" for the added record, allocates the issued ID of "00004" to the added record, and initializes the value stored in the "maximum length" field to 0 (zero).

Further, for convenience of explanation, for example, it is assumed that the literal registration unit 605 selects the language in the order of the Japanese language, the English language, the Chinese language. The order in which the language is selected by the literal registration unit 605 is arbitrary.

In a case of the selection order described above, the Japanese language is selected in the first execution of step S108 regarding the current string literal of " 勤続年数 ". Accordingly, the string literal of the Japanese language of " 勤続年数 " is obtained in the first execution of step S108 regarding the current string literal.

The byte length of the string literal of the Japanese language of " 勤続年数 " is "8" and "8" is greater than "0". Accordingly, at step S110, the value stored in the "maximum length" field of the fourth record of the offset list 613 is updated with 8.

Also, at step S111, the string literal of the Japanese language of " 勤続年数 " is registered in the Japanese language literal list 610. Specifically, the fourth record of the Japanese language literal list 610 of FIG. 9 is newly added. Further, the literal registration unit 605 allocates the ID of "B00004", which contains the ID of "00004" issued at step S106 as a suffix, to the new record, and computes a record length based on the byte length of the string literal of " 勤続年数 ". As a result, the record as illustrated in FIG. 9 is added.

Subsequently, the English language is selected in the second execution of step S108 regarding the current string literal. Accordingly, the string literal of the English language of "Length of Service" is obtained in the second execution of step S108 regarding the current string literal.

The byte length of the string literal of the English language of "Length of Service" is "17" and "17" is greater than "8". Accordingly, at step S110, the value stored in the "maximum length" field of the fourth record of the offset list 613 is updated with "17".

Also, at step S111, the string literal of "Length of Service" is registered in the English language literal list 611. Specifically, the fourth record of the English language literal list 611 of FIG. 9 is newly added. Further, the literal registration unit 605 allocates the ID of "C00004", which contains the ID of "00004" issued at step S106 as a suffix, to the new record, and computes the record length based on the byte length of the string literal of "Length of Service". As a result, the record as illustrated in FIG. 9 is added.

Subsequently, the Chinese language is selected in the third execution of step S108 regarding the current string literal. Accordingly, the string literal of the Chinese language of " 工龄 " is obtained in the third execution of step S108 regarding the current string literal. The byte length of the string literal of the Chinese language of " 工龄 " is "4" and "4" is not greater than "17". Accordingly, step S110 is skipped.

Also, at step S111, the string literal of " 工龄 " is registered in the Chinese language literal list 612. Specifically, the fourth record of the Chinese language literal list 612 of FIG. 9 is newly added. Further, the literal registration unit 605 allocates the ID of "D00004", which contains the ID of "00004" issued at step S106 as a suffix, to the new record, and computes the record length based on the byte length of the string literal of " 工龄 ". As a result, the record as illustrated in FIG. 9 is added.

Also, the literal registration unit 605 determines that the "unselected language does not exist" in the fourth execution of step S107 regarding the current string literals. As a result, the process of FIG. 12 goes back to step S101.

Further, for simplicity of explanation, a flowchart for a case where the number of string literals contained in a single statement is one at maximum in FIG. 12. When two or more string literals are contained in a single statement, the determination of step S104 is performed regarding each string literal contained in the statement read at step S102. Also, regarding each string literal, step S105 is executed or step S106 to step S111 are executed according to the determination result at step S104.

In the meantime, the allocation unit 606 performs a suitable processing such as allocation of registers or computation of the number of bytes of each section after the process of FIG. 12 as described above is completed. Thereafter, the object code generation unit 607 generates the object code.

Figure 13:
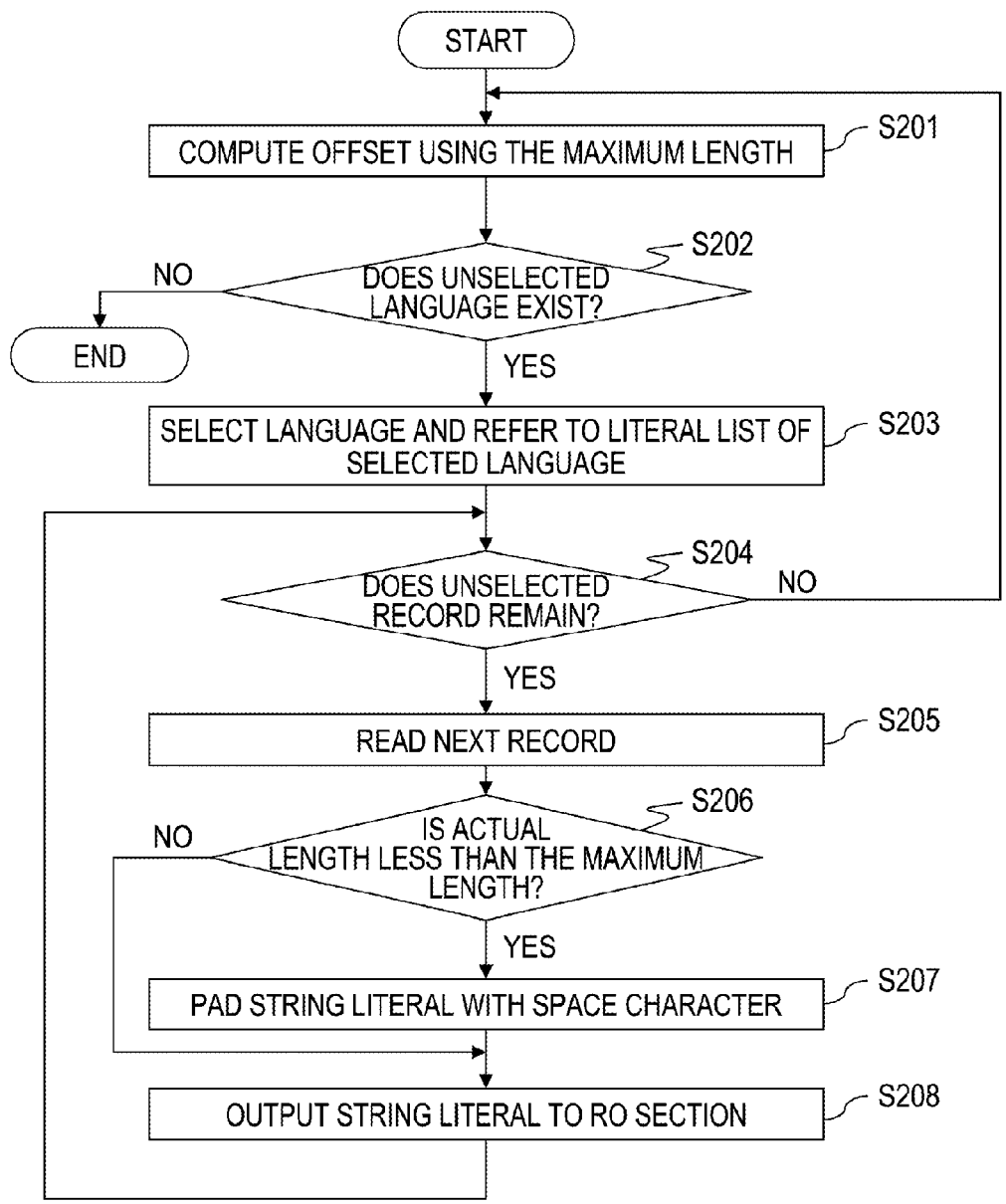
FIG. 13 is a flowchart illustrating an RO section (read-only section) preparation process performed by the compiler of the second embodiment.

The process of FIG. 13 is one of a series of processes performed by the object code generation unit 607 in order to generate the object code. Specifically, FIG. 13 is a flowchart illustrating an RO section preparation process performed by the compiler 500 of the second embodiment. More specifically, FIG. 13 is a flowchart of a process of preparing the section, in which the language dependent string literals are stored, by the literal placement unit 608 of the object code generation unit.

At step S201, the literal placement unit 608 computes the offset stored in the offset list 613 using the maximum length stored in the offset list 613. Specifically, the literal placement unit 608 sets the value of the "offset" field of the first record of the offset list 613 to 0 (zero). Further, regarding each i which satisfies 1<i, the literal placement unit 608 computes the total of the values of the "maximum length" field and the "offset" field of the (i−1)th record of the offset list 613, and sets the computed total in the "offset" field of the ith record. As a result, as illustrated in FIG. 9, the value is set in the "offset" field of each record of the offset list 613.

Next, at step S202, the literal placement unit 608 determines whether the language (e.g., the unselected language) that the string literal which is not yet placed remains among the languages that the string literals are stored in the locale resource file 502. Further, the order of language selection is fixed. For example, the literal placement unit 608 selects the language according to the order of columns in the locale resource file 502.

For example, in the example of FIG. 6, the "languages that the string literals are stored in the locale resource file 502" are three languages, specifically, the English language, the Chinese language, and the Japanese language. Accordingly, the literal placement unit 608 determines whether the unselected language remains among the English language, the Chinese language, and the Japanese language.

When it is determined that the unselected language does not remain (e.g., when placing of the string literals regarding all the languages is completed), the process of FIG. 13 is completed. In contrast, when the unselected language remains, the process of FIG. 13 proceeds to step S203.

AT step S203, the literal placement unit 608 selects one unselected language among the languages that the string literals are stored in the locale resource file 502. Also, the literal placement unit 608 refers to the literal list of the selected language. For example, when it is intended to select the Japanese language, the literal placement unit 608 refers to the Japanese language literal list 610.

Next, at step S204, the literal placement unit 608 determines whether the unselected record remains in the literal list (e.g., the Japanese language literal list 610) of the language selected at step 203.

When it is determined that the unselected record remains, the literal placement unit 608 reads the next record (e.g., the record having an ID of which order is earliest when being represented by the ID among the unselected records) at step S205. In contrast, when all the records have been completely selected, the process of FIG. 13 goes back to step S202.

Subsequent to step S205, the literal placement unit 608 compares the following two values with each other at step S206.

An actual length of the string literal (e.g., the actual byte length) stored in the "value" field of the record read at step S205

A value of the "maximum length" field of the record within the offset list 613 for which the suffix of the ID of the record read at step S205 is allocated as an ID For example, it is assumed that the literal placement unit 608 reads the second record of the Japanese language literal list 610 at step S205. In this case, the actual length of the string literal of the Japanese language of "基本給" in the "value" field is 6-byte. Further, the ID of the second record of the Japanese language literal list 610 is "B00002" and the suffix thereof is "00002". Accordingly, the literal placement unit 608 refers to the record having the ID of "00002" in the offset list 613 and reads the maximum length of 11-byte stored in the "maximum length" field of the record.

Also, when it is determined that the actual length is less than the maximum length, the literal placement unit 608 pads the string literal of the record read at step S205 with space characters at step S207. Accordingly, the literal placement unit 608 makes the byte length of the string literal padded with the space characters equal to the maximum length which is referenced at step S206.

For example, it is assumed that the second record of the Japanese language literal list 610 is read at step S205. In this case, as described above, the actual length is 6-byte and the maximum length is 11-byte. Accordingly, the literal placement unit 608 additionally appends five space characters after the string literal of the Japanese language of "基本給". Accordingly, the string literal of "基本給" having the length of 11-byte and padded with five space characters is obtained.

In contrast, at step S206, when it is determined that the actual length is not less than the maximum length (e.g., when the actual length is equal to the maximum length), step S207 is skipped. For example, when the English language is selected at step S203 and the second record of the English language literal list 611 is read at step S206, the actual length is 11-byte and the maximum length is also 11-byte. Accordingly, in this case, step S207 is skipped.

Thereafter, at step S208, the literal placement unit 608 outputs the string literal to the RO section of the object code. Specifically, when step S207 is executed, the literal placement unit 608 outputs the string literal (e.g., the string literal of "基本給" padded with five space characters) obtained at step S207. In contrast, when step S207 is skipped, the literal placement unit 608 outputs the string literal itself (e.g., the string literal of "Base Salary") stored in the "value" field of the record read at step S205.

Further, the literal placement unit 608 outputs (e.g., places) the language independent string literals to a range spanning from byte 0 to byte (X−1) of the RO section based on the language independent literal list 609 before executing the process of FIG. 13. Also, the literal placement unit 608 sets an initial value of an address (hereinafter, referred to as the "output address") to which the string literal is output at the time of starting the process of FIG. 13. The initial value of the output address is, specifically, the start address (e.g., Xth byte of the RO section) of the section for the language dependent string literals of the RO section.

At step S208, the literal placement unit 608 outputs (e.g., places) the string literals to the location of output address. Also, the literal placement unit 608 adds the maximum length referenced at step S206 to the current output address and sets the addition result as a new output address.

The process of FIG. 13 goes back to step S204 after execution of step S208. As a result, as illustrated in FIG. 6, the same number of bytes is allocated to the string literals having meanings that correspond to each other between the plurality of languages in the RO section of the object file 503. For example, among three string literals corresponding to the string literal that appears ith in the source file 501, the string literal of the jth language ($1 \le j \le 3$) is placed within a range spanning from byte $(X+(j-1) \cdot Y+Oi)$ to byte $(X+(j-1) \cdot Y+Oi+Bi-1)$ of the RO section.

Further, after the literal placement unit 608 completes the process of FIG. 13, the object code generation unit 607 generates the sequence of instructions (e.g., the machine code corresponding to the assembly code of FIG. 10 and FIG. 11) illustrated in FIG. 10 and FIG. 11 and inserts the generated sequence of instructions in the object code. By doing this, the object code generation unit 607 generates the object code which contains the string literals and the sequence of instructions and outputs the generated object code as the object file 503.

Subsequently, descriptions will be made on the third embodiment with reference to FIG. 14 and FIG. 15. Further, descriptions on the common features between the second embodiment and the third embodiment will be suitably omitted.

In the third embodiment, the listing sequence of the language dependent string literals within the object code is different from that of the second embodiment. Further, in the third embodiment, a sequence of instructions which is different from that in the second embodiment is generated according to the difference in a listing sequence of the language dependent string literals. Accordingly, in the third embodiment, the operations of the object code generation unit 607 of the compiler 500 of FIG. 7 are different from those in the second embodiment.

Figure 14:
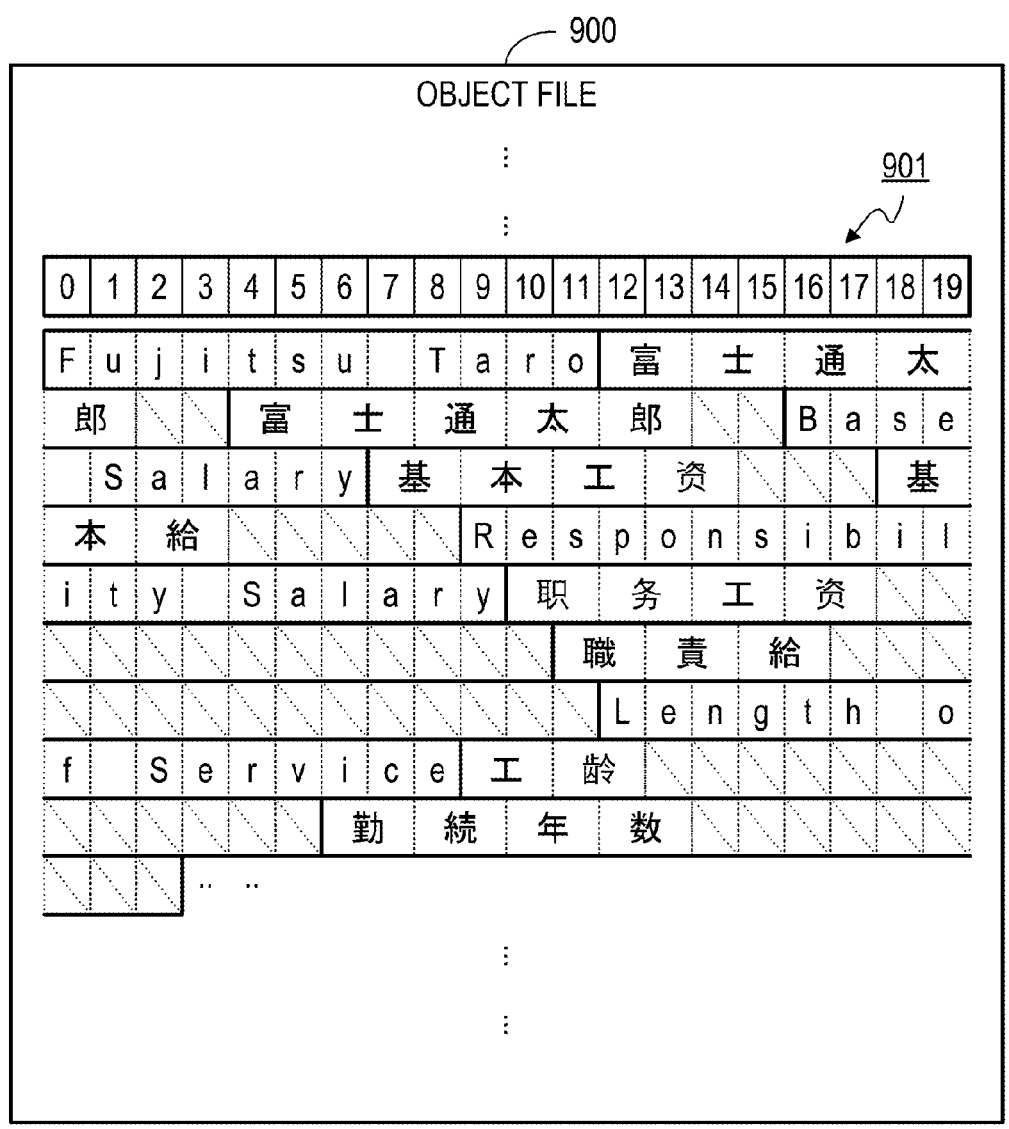
FIG. 14 is a diagram exemplifying a portion where language dependent string literals are placed among the RO section of an object code generated in the third embodiment.

FIG. 14 is a diagram exemplifying a portion where language dependent string literals (hereinafter, the portion is referred to as the "section 901") are placed among the RO section of the object file 900 generated in the third embodiment. In FIG. 14, in the RO section, the section for storing the language independent string literals (e.g., byte 0 to byte (X−1) of the RO section) is omitted. The section for storing the language independent string literals is the same as that of the second embodiment (see, e.g., FIG. 6). That is, in FIG. 14, a portion after byte X of the RO section is illustrated.

For convenience of explanation, it is assumed that the source file 501 and the locale resource file 502 of FIG. 6 are used also in the third embodiment. Also, in the third embodiment, the same byte length is allocated to the string literals that correspond to each other in the locale resource file 502.

For example, 12-byte is allocated to all of three string literals that correspond to each other in the first record of the locale resource file 502. This is because the maximum of the byte lengths of these three string literals is 12-byte.

Similarly, 11-byte is allocated to all of three string literals that correspond to each other in the second record of the locale resource file 502. Further, 21-byte is allocated to all of three string literals that correspond to each other in the third record and 17-byte is allocated to all of three string literals that correspond to each other in the fourth record.

Specifically, within the section 901, the string literals are placed as follows. Further, the start address of the section 901 is the Xth byte in the RO section.

Byte 0 to Byte 11: "Fujitsu Taro" (English language. No padding)

Byte 12 to Byte 23: "富士通太郎" (Chinese language. Byte 22 and Byte 23 are padded bytes)

Byte 24 to Byte 35: "富士通太郎" (Japanese language. Byte 34 and Byte 35 are padded bytes)

Byte 36 to Byte 46: "Base Salary" (English language. No padding)

Byte 47 to Byte 57: "基本工资" (Chinese language. Byte 55 to Byte 57 are padded bytes)

Byte 58 to Byte 68: "基本給" (Japanese language. Byte 64 to Byte 68 are padded bytes)

Byte 69 to Byte 89: "Responsibility Salary" (English language. No padding)

Byte 90 to Byte 110: "职务工资" (Chinese language. Byte 98 to Byte 110 are padded bytes)

Byte 111 to Byte 131: "職責給" (Japanese language. Byte 117 to Byte 131 are padded bytes)

Byte 132 to Byte 148: "Length of Service" (English language. No padding)

Byte 149 to Byte 165: "工龄" (Chinese language. Byte 153 to Byte 165 are padded bytes)

Byte 166 to Byte 182: "勤続年数" (Japanese language. Byte 174 to Byte 182 are padded bytes)

The compiler 500 of the third embodiment executes the process of FIG. 12 and step S201 of the process of FIG. 13 similarly as in the second embodiment. However, as is apparent from the above descriptions, after executing the process of FIG. 12 and step S201 of the process of FIG. 13, the literal placement unit 608 of the third embodiment outputs the language dependent string literals to the section 901 in the order which is different from the ordering of step S202 to step S208.

Specifically, the literal placement unit 608 selects the records of the offset list 613 in the order of ID. The selection sequence is the same as the order in which the language dependent string literals appear in the source file 501. Also, the literal placement unit 608 determines whether the "unselected language for the current record selected from the offset list 613 remains".

When the unselected language exists, the literal placement unit 608 selects the language. The order of language selection is fixed. For example, the literal placement unit 608 selects the English language, the Chinese language, the Japanese language in this order according to the order of columns in the locale resource file 502.

Further, the literal placement unit 608 refers to the literal list of the selected language to read the value stored in the "value" field of the record to which the ID (e.g., "B00003") containing the ID (e.g., "00001") of the record selected from offset list 613 as a suffix. That is, the literal placement unit 608 reads the string literal of the selected language.

Also, the literal placement unit 608 compares the actual length with the maximum length, similarly as at step S206. When the actual length is less than the maximum length, the literal placement unit 608 pads the string literal with the space characters, similarly as at step S207. Thereafter, the literal placement unit 608 outputs the string literals to the location of the output address. Outputting of the string literal is the same as that performed at step S208, and initialization and updating of the output address are similar to those in the second embodiment.

However, after the string literal is output, the literal placement unit 608 of the third embodiment, determines again whether the "unselected language for the current record selected from the offset list 613 remains" at a later time. When all the languages have been completely selected, the literal placement unit 608 selects a next record of the offset list 613.

According to the order described above, the literal placement unit 608 of the third embodiment places the plurality of language dependent string literals in the section 901 for each literal tuple.

In the meantime, FIG. 15 is a diagram exemplifying sequence of instructions generated by the object code generation unit 607 in the third embodiment. The section for the sequence of instructions as illustrated in FIG. 15 is placed after the RO section of the object file 900.

The label 902 of "LocaleJudgment" of FIG. 15 is the same as the label 802 of FIG. 10. Although being omitted in FIG. 15, the label which is the same as the label 800 or the label 801 exists ahead of the label 902. Further, although being omitted in FIG. 15, the sequence of instructions which is the same as the portion spanning from the instruction 803 to the label 823 of FIG. 10 is continued after the label 902. Accordingly, at the time of execution of the instruction 903, the value of "0", "1", or "2" is stored in the register Reg2 according to the locale in the execution environment.

The instructions 903 and 904 are the same as the instructions 827 and 828 of FIG. 11. Further, in FIG. 11, although instructions 825 and 826 exist ahead of the instruction 827, the instructions 825 and 826 are not generated in the third embodiment.

The instructions 905 to 910 are instructions for displaying the string literal according to the locale in execution that correspond to the first language dependent string literal of "富士通太郎" written in the source file 501.

The instruction 905 is an instructions for setting (e.g., copying) the value stored in the register Reg2 in the register Reg3. The instruction 906 is an instruction for multiplying the value stored in the register Reg3 with "12" and storing the multiplication result in the register Reg3. The object code generation unit 607 reads the value of "12" from the "maximum length" field of the first record of the offset list 613 and generates the instruction 906 using the read value of "12".

The instruction 907 is an instructions for setting a total of the value stored in the base register, the value stored in the register Reg3, "X", and the value of "0" in the register Reg4. Further, the "X" indicates the byte length of the section for the language independent string literals, similarly as in the second embodiment.

The object code generation unit 607 reads the value of "0" from the "offset" field of the first record of the offset list 613 and multiplies "0" and "3" (e.g., the number of languages that the string literals are defined in the locale resource file 502). As the multiplication result, the value of "0" is obtained. Also, the object code generation unit 607 generates the instruction 907 using the value of "0" obtained by doing as described above.

Here, as explained regarding Equation (1), the value (e.g., the value of "0", "1", or "2" according to the locale in execution) set in the register Reg2 by the instructions 809, 814, 819, or 822 is denoted by "r". Further, it should be noted that as described above, although being omitted in FIG. 15, the sequence of instructions that is the same as the portion spanning from the instruction 803 to the label 823 of FIG. 10 is generated by the object code generation unit 607 also in the third embodiment.

Further, among the language dependent string literals, the offset Oi stored in the offset list 613 by being corresponded to the string literal that appears ith within the source file 501 is "0" for i=1, and (B1+ ... Bi-1) for 1<i.

Accordingly, as will be seen from FIG. 9, FIG. 10, FIG. 14, and FIG. 15, the start address Ai of the ith string literal of the language according to the locale in execution is represented not by Equation (1) but represented by similarly as Equation (2).

$$Ai = \text{StartAddr} + \text{Offset} + X + 3 \cdot Oi + r \cdot Bi \tag{2}$$

The instruction 907 is an example of an instruction for calculating the start address A1 of the first string literal of the language according to the locale in execution and setting the start address A1 in the register Reg4. That is, the start address A1 is referenced based on the execution result of the instruction 907.

Further, the right side of Equation (2) represents an addition of five values. The total "(StartAddr+Offset)" of values of the first argument and the second argument is set in the base register as the execution result of the instructions 903 and 904. Further, the fifth value of "(r·Bi)" is set in the register Reg3 as the execution result of the instructions 905 and 906. Therefore, the start address A1 is expressed as the second operand of the instruction 907.

Further, the start address is set in the register Reg3 in the example of FIG. 11 in the second embodiment while the start address is set in the register Reg4 in the example of FIG. 15 of the third embodiment as described above. Therefore, the register Reg4 is designated as the second operand of the instruction 908. However, except for that point, the instruction 908 is the same as the instruction 830 of FIG. 11. Further, the instructions 909 and 910 subsequent to the instruction 908 are the same as the instructions 831 and 832 of FIG. 11. As described above, the object code generation unit 607 determines the operands of the instructions 906, 907, and 909 and generates the instructions 906, 907, and 909 based on the first record of the offset list 613.

The instructions 911 to 916 are instructions for displaying the string literal according to the locale in execution that corresponds to the second language dependent string literal of "基本給" written in the source file 501. For example, the instruction 913 is an instruction for setting the start address A2 of the second string literal of the language according to the locale in execution in the register Reg4 and the start address A2 is referenced based on the execution result of the instruction 913.

The instructions 911 to 916 are similar to the instructions 905 to 910. The only difference between the instructions 911 to 916 and the instructions 905 to 910 is just the operands of the instructions 912, 913, and 915.

Specifically, since the value of the "maximum length" field of the second record of the offset list 613 is "11", the value of "11" is designated as each of the second operands of the instructions 912 and 915. Further, since the value of the "offset" field of the second record of the offset list 613 is "12" and the result of multiplication of "12" and "3" is "36", the value of "36" is contained in the operand of the instruction 913. That is, the object code generation unit 607 generates the instruction 912, 913, and 915 based on the second record of the offset list 613.

The instructions 917 to 922 are instructions for displaying the string literal according to the locale in execution that corresponds to the third language dependent string literal of "職責給" written in the source file 501. For example, the instruction 919 is an instruction for setting the start address A3 of the third string literal of the language according to the locale in execution in the register Reg4 and the start address A3 is referenced based on the execution result of the instruction 919.

The instructions 917 to 922 are similar to the instructions 905 to 910. The only difference between the instructions 917 to 922 and the instructions 905 to 910 is just the operands of the instructions 918, 919, and 921.

Specifically, since the value of the "maximum length" field of the third record of the offset list 613 is "21", the value of "21" is designated as each of the second operands of the instructions 918 and 921. Further, since the value of the "offset" field of the third record of the offset list 613 is "23" and the result of multiplication of "23" and "3" is "69", the value of "69" is contained in the operand of the instruction 913. That is, the object code generation unit 607 generates the instruction 918, 919, and 921 based on the third record of the offset list 613.

The instructions 923 to 928 are instructions for displaying the string literal according to the locale in execution that correspond to the fourth language dependent string literal of "勤続年数" written in the source file 501. For example, the instruction 925 is an instruction for setting the start address A4 of the fourth string literal of the language according to the locale in execution in the register Reg4 and the start address A4 is referenced based on the execution result of the instruction 925.

The instructions 923 to 928 are similar to the instructions 905 to 910. The only difference between the instructions 923 to 928 and the instructions 905 to 910 is just the operands of the instructions 924, 925, and 927.

Specifically, since the value of the "maximum length" field of the fourth record of the offset list 613 is "17", the value of "17" is designated as each of the second operands of the instructions 924 and 927. Further, since the value of the "offset" field of the fourth record of the offset list 613 is "44" and the result of multiplication of "44" and "3" is "132", the value of "132" is contained in the operand of the instruction 925. That is, the object code generation unit 607 generates the instruction 924, 925, and 927 based on the fourth record of the offset list 613.

As will be known from FIG. 15, according to the third embodiment, it is possible for the object code generation unit 607 to decide the operands of the instructions 907, 913, 919, 925 at the time of compilation. This is because, firstly, for example, a common offset irrelevant to the locale in execution such as an offset of "(X+36)" in the instruction 913 is decided at the time of compilation. Also, secondly, this is because the start address of the string literal according to the locale in execution may be represented using the common offset. That is, the problem occurring in the third comparative example that "Since the operand is unable to be decided at the time of compilation, the compilation process fails" does not also occur in the third embodiment.

Further, in FIG. 15, the portion of "+X+36" is contained in the operand of the instruction 913. The portion "+X+36" corresponds to the portion of "+X+3·$O_i$" in Equation (2) in a case of i=2. However, the portion of "+X+36" contained in the instruction 913 does not mean that an addition of "X" and an addition of "36" are performed at the time of execution.

Since the "X" is the value which is decided at the time of compilation, the object code generation unit 607 actually calculates the total of the "X" and "36" and designates the calculated total of "(X+36)" to be contained in the operand of the instruction 913. Those matters described above may also be similarly applied to the instructions 907, 919, and 925.

Subsequently, descriptions will be made on the fourth embodiment with reference to FIG. 16. Further, descriptions on the common features between the fourth embodiment and the second embodiment will be suitably omitted.

Figure 16:
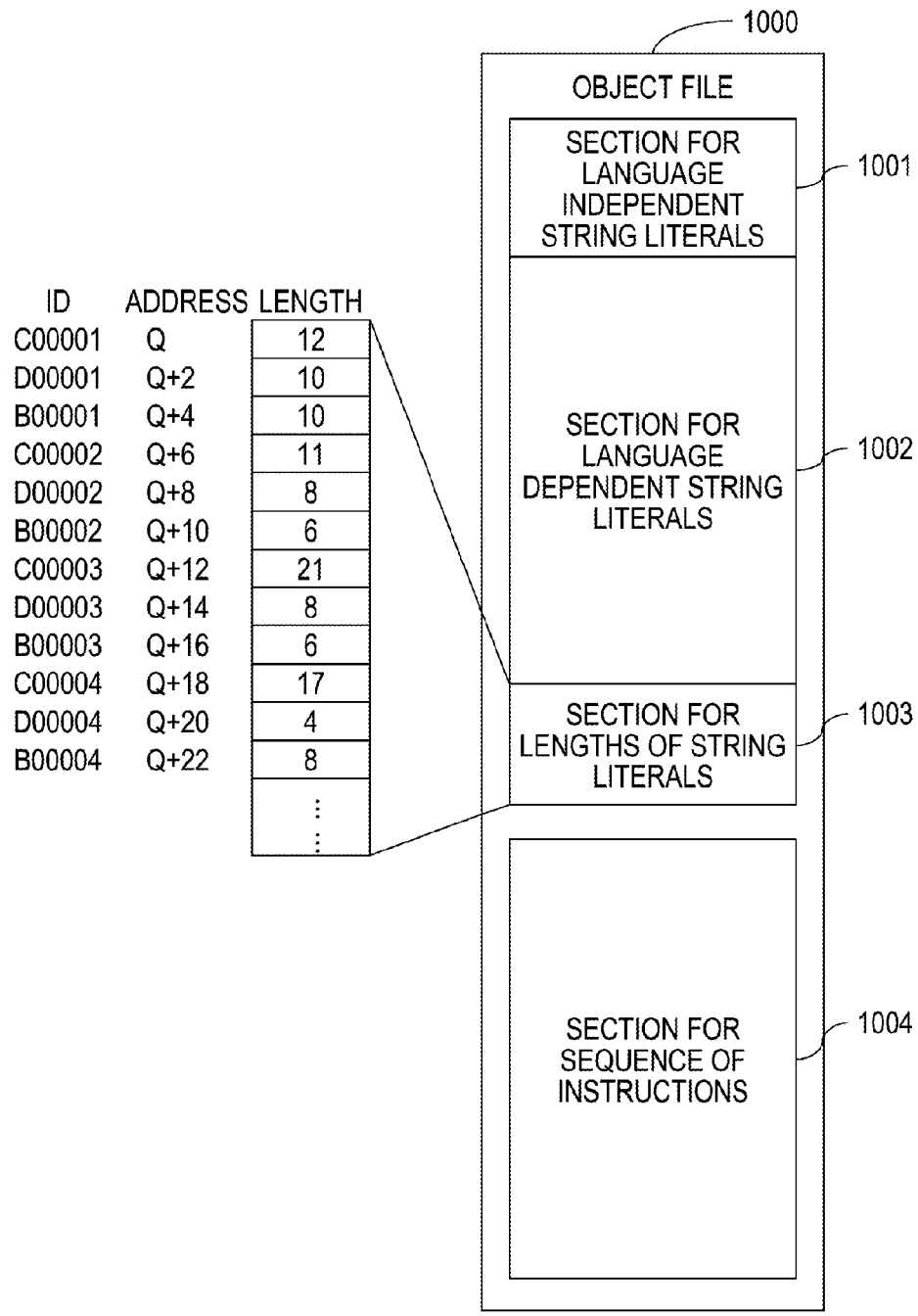
FIG. 16 is a diagram exemplifying data embedded in the object code in a fourth embodiment.

FIG. 16 is a diagram exemplifying data to be embedded in the object file in a fourth embodiment. An object file 1000 of FIG. 16 contains a section 1001 for the language independent string literals and a section 1002 for the language dependent string literals.

The section 1001 and the section 1002 occupy a portion of the RO section. The section 1001 and the section 1002 are the same as the RO section (containing the section for the language independent string literals and the section for the language dependent string literals) within the object file 503 of FIG. 6 of the second embodiment. Further, in the fourth embodiment, the listing sequence of the literals in the section 1002 is the same as that illustrated in FIG. 6 of the second embodiment. However, an embodiment in which the listing sequence of the literals in the section 1002 is changed to a listing sequence which is the same as that illustrated in FIG. 14 in the third embodiment.

In the section 1002, the string literal may be padded with the predetermined character (e.g., space character) similarly as in the second and the third embodiments. However, padding with the predetermined character may be omitted in the fourth embodiment.

In the section 1002, the same byte length is allocated to the string literals of the plurality of languages that correspond to each other regardless of whether the string literal is to be padded with the predetermined character. For example, the 11-byte is allocated to any one of the string literals of "Base Salary", "基本工资", and "基本給" within the section 1002. This is because the length of the "Base Salary" which has the longest byte length among three string literals is 11-byte. When the padding is omitted, 5 bytes subsequent to the string literal of "基本給" having the length of 6-byte is just disregarded at the time of execution.

In the fourth embodiment, the object file 1000 further contains the section 1003 for the lengths of string literals. The section 1003 is also a portion of the RO section. Details of the section 1003 are also illustrated in FIG. 16. The numeric values indicating the lengths of the respective language dependent string literals are stored in the section 1003. In FIG. 16, for convenience of referring to, the IDs and the addresses of the string literals are illustrated in addition to the numeric values.

For example, as illustrated in FIG. 9, three string literals identified by the IDs "C00001", "D00001", and "B00001" correspond to each other and the lengths of the string literals are 12 bytes, 10 bytes, and 10 bytes, respectively. In FIG. 16, for convenience, the addresses (e.g., "Q", "Q+2", and "Q+4") for a case where the lengths of the string literals are represented by the numeric value of 2 bytes are illustrated. That is, in the section 1003, the numeric values of "12", "10", and "10" are stored and the addresses in which these numeric values are stored are "Q", "Q+2", and "Q+4", respectively. Further, Q is equal to X+3Y, that is, Q=X+3Y.

Similarly, in the section 1003, the numeric values of "11", "8", and "6" that indicate the lengths of three string literals identified by the IDs of "C00002", "D00002", and "B00002", respectively, are stored. Further, the numeric values of "21", "8", and "6" that indicate the lengths of three string literals identified by the IDs of "C00003", "D00003", and "B00003" are also stored in the section 1003. Furthermore, the numeric values of "17", "4", and "8" that indicate the lengths of three string literals identified by the IDs of "C00004", "D00004", and "B00004", respectively, are also stored in the section 1003.

The object code generation unit 607 of the fourth embodiment may execute, for example, the process of FIG. 13 to suitably place the string literals in the section 1002 for the language dependent string literals. Thereafter, the object code generation unit 607 may record the numeric value indicating the length of the string literal within the section 1003 as described above based on the respective literal lists of languages 610 to 612. The object code generation unit 607 may refer to the respective literal lists of languages 610 to 612 to recognize the respective lengths of the string literals.

Further, the object code generation unit 607 records the numeric values in the section 1003 according to the order of languages in the section 1002. For example, it is assumed that the object code generation unit 607 has placed the string literals in the section 1002 according to the order of languages in which "the English language is placed firstly, the Chinese language is placed secondly, and the Japanese language is placed thirdly", which is the same as the order in FIG. 6. In this case, the object code generation unit 607 places three numeric values in the following sequence with respect to each literal tuple as illustrated in FIG. 16. That is, the object code generation unit 607 places, with respect to each literal tuple, the numeric value indicating the length of the string literal of the English language in the first place, places the numeric value indicating the length of the string literal of the Chinese language in the second place, and places the numeric value indicating the length of the string literal of the Japanese language in the third place.

Further, the object file 1000 contains a section 1004 for the sequence of instructions after the sections 1001, 1002, and 1003. In the section 1004, the instructions similar to those illustrated in FIG. 10 and FIG. 11 are contained. However, the sequence of instructions in the section 1004 is different from those of FIG. 10 and FIG. 11 in the following matters.

An instruction (e.g., "Mov Reg5, Reg2") for copying the value of the register Reg2 onto the register Reg5 is inserted ahead of the instruction 825. Accordingly, the values of, such as "0", "1", and "2" according to the LCID in execution are stored in the register Reg5.

Next, an instruction (e.g., "Mul Reg5, 2") for making the value of the register Reg5 double is inserted. The reason why the second operand of the instruction is "2" is because the numeric value indicating the length of the string literal is represented by 2 bytes in the example of FIG. 16.

After the instruction, the instructions 825 to 828 that are the same as those of FIG. 11 are continuously placed. Although the instructions 829 to 832 for displaying the first string literal are generated in the second embodiment, the object code generation unit 607 of the fourth embodiment may generate an instruction such as "Lea Reg6, [BaseReg+Reg5+Q]" or "Mov DispReg2, [Reg6]" instead of the instruction 831.

When these two instructions are executed, the numeric value indicating the length of the string literal according to the LCID in execution is read and the read numeric value is set in the register DispReg2.

Similarly, the object code generation unit 607 may generate an instruction such as "Lea Reg6, [BaseReg+Reg5+Q+6]" or "Mov DispReg2, [Reg6]" instead of the instruction 835, regarding displaying of the second string literal. Further, since the length of the string literal is represented by the numeric value of 2 bytes, the string literals of three languages are contained in the section 1002, and 2×3×2−1=6, the portion of "+Q+6" is contained in the instruction.

Similarly, the object code generation unit 607 may generate an instruction such as "Lea Reg6, [BaseReg+Reg5+Q+12]" or "Mov DispReg2, [Reg6]" (because (2×3×(3−1)=12)) instead of the instruction 839, regarding displaying of the third string literal. Further, the object code generation unit 607 may generate an instruction such as "Lea Reg6, [BaseReg+Reg5+Q+18]" or "Mov DispReg2, [Reg6]" (because 2×3×(4−1)=18) instead of the instruction 843, regarding displaying of the fourth string literal.

As described above, the object code generation unit 607 may contain a numeric value which indicates the length of each string literal and otherwise generate an instruction for referring to the numeric value in the RO section. Although the lengths between the string literals that correspond to each other are different from each other according to the language, an instruction for setting the length of the string literal of the language according to the locale in execution in a predetermined register may be decided at the time of compilation in the fourth embodiment.

For example, an application may exist which is suitable for the string literal having a shorter length according to the locale rather than the language independent string literal of which length is uniformly adjusted (e.g., padded with). In the fourth embodiment, since the actual length of the string literal according to the locale is read from the section 1003 at the time of execution, the fourth embodiment is also suitable for the application described above.

Further, as described above, the listing sequence of the string literals in the section 1002 may be the same as that in FIG. 14. In this case, the specific sequence of instructions in the section 1004 is similar to the sequence of instructions of FIG. 15, differently from the example described above.

However, the instructions of "Mov Reg5, Reg2" and "Mul Reg5, 2" that are the same as those described above are inserted (e.g., after the instruction 904). Further, among the instruction contained in FIG. 15, the instructions 909, 915, 921, and 927 are replaced with separate instructions similarly as in the fourth embodiment where the instructions 831, 835, 839, and 843 are replaced with separate instructions as described above.

Further, the second operands of the instructions 906, 912, 918, and 924 are the values of the maximum length field of the offset list 613. However, the instruction 906, 912, 918, and 924 are not changed also in the fourth embodiment. This is because the second operand of the instruction is not the value used for designating the length of the string literal but the value used for computing the start address of the string literal.

Further, an embodiment in which the listing sequence of the numeric values in the fourth embodiment is changed may be made. Specifically, the object code generation unit 607 may record a plurality of numeric values that indicate the lengths of a plurality of string literals of a single language in a plurality of addresses that are continuous. In this case, the object code generation unit 607 generates the instruction which contains an operand suitable for suitably designating the addresses according to the listing sequence of the numeric values.

In the meantime, the present disclosure is not limited to the first embodiment to the fourth embodiment. Although several modifications are described also in the above description, the first to the fourth embodiments also may be modified to various modifications, for example, from the following viewpoint. The various embodiments described above and which will be described below may be arbitrarily combined as long as the embodiments are not inconsistent with each other.

For convenience of explanation, specific instructions are described in an assembly code format in several figures, but the instruction actually contained in the object code is the machine code. Also, the formats of individual instructions of the machine language may differ according to the instruction set of the computer which executes the executable file obtained from the object file. The compiler may generate the suitable instruction according to the instruction set according to the embodiment.

The compiler may generate the assembly code instead of the object code described in the machine code depending on a situation (e.g., in a case where a specific command option is designated). Also, the assembler may generate the object code from the assembly code.

The instruction to be generated may differ depending on the instruction set as well as the specific installation of the compiler. Further, the specific names of the registers illustrated in, for example, FIG. 10, FIG. 11, and FIG. 15, are just examples for convenience of explanation.

For example, the object code generation unit 607 may omit the instruction 825 of FIG. 11 and instead of the instruction 825, may designate "Y" as the second operand of the instruction 814 of FIG. 10 and also may designate "2Y" as the second operand of the instruction 819 of FIG. 10. Further, since the multiplication of "0" and "Y" is "0", the second operands of the instructions 809 and 822 are also "0" similarly as in FIG. 10 for the case where the instruction 825 is omitted. That is, one or more instructions for calculating the start address of the string literal using a numeric value that corresponds to the locale in execution among three numeric values of "0", "Y", and "2Y" that correspond to three languages may be generated.

In the meantime, the space characters are used for padding the string literal at step S207 of FIG. 13. However, a character, for example, NULL character, other than the space character may be used for padding the string literal depending on in embodiment (e.g., depending on the programming language to be compiled).

For example, a null-terminated string literal may be used. In this case, the maximum length which is set in the offset list 613 by the process of FIG. 12 may be the byte length of the string literal containing the NULL character. Further, in this case, the NULL characters may be used for padding the string literal.

A fixed value is designated as the operand indicating the length of the string literals in the instructions 831, 835, 839, and 843 of FIG. 11 or the instructions 909, 915, 921, and 927 of FIG. 15. However, depending on the embodiment, a separate sequence of instructions may be used instead of the instruction for which the fixed value is designated.

For example, the object code generation unit 607 may generate the sequence of instructions which find out the end of the string literal by reading the string literal from the top of the string literal 1-byte by 1-byte. The sequence of instructions may contain, for example, an instruction which compares the byte read from the string literal with a special character (e.g., NULL character) indicating the end of the string literal, and a conditional branch instruction which instructs to branch according to the comparison result.

In the meantime, the maximum length for the string literals of the plurality of languages that correspond to each other may include various values, for example, values as illustrated in FIG. 9. Further, the unit of memory management may be greater than 1-byte in a certain architecture.

For example, the unit of memory management may be 4-byte. When the unit of memory management is greater than 1-byte, the length which is "the minimum of lengths that are greater than the maximum length and divisible by unit of memory management" may be used instead of the "maximum length itself".

For example, it is assumed that the unit of memory management is 4-byte. Further, the values of "12", "11", "21", and "17" are recorded in the offset list 613 of FIG. 9 as the maximum lengths. In this case, respective embodiments described above may be modified as follows.

Since the number "12" is divisible by the number "4", the maximum length itself of "12" is used. For example, "12" is designated as an operand in the instructions 831, 906, and 909.

The number "11" is not divisible by "4". A minimum integer which is greater than or equal to "11" and is divisible by "4 is "12". Accordingly, "12" is used instead of "11". For example, "12" is designated as an operand in the instructions 835, 912, and 915 instead of "11".

The number "21" is not divisible by "4". A minimum integer which is greater than or equal to "21" and is divisible by "4" is the number "24". Accordingly, "24" is used instead of "21". For example, "24" is designated as an operand in the instructions 839, 918, and 921 instead of "21".

The number "17" is not divisible by "4. A minimum integer which is greater than or equal to "17" and is divisible by "4 is the number "20". Accordingly, "20" is used instead of "17". For example, "20" is designated as an operand in the instructions 843, 924, and 927 instead of "17".

Further, in the embodiment in which the values of "12", "24", and "20" as described above are used instead of the maximum lengths of "11", "21", and "17", the values of "12", "24", and "20" are recorded in the "maximum length" field of the offset list 613. That is, the "maximum length" which is referenced and updated at steps S109 and S110 has the value which is greater than the actual maximum length of the string literal.

Further, at step S201, an offset is calculated based on the "maximum length" field of the offset list 613. The offset calculated as described above may differ from the value illustrated in FIG. 9. For example, the offset of the fourth record of the offset list 613 is changed to "48 (=12+12+24+20)". Accordingly, the operands of the instructions 829, 833, 837, 841, 907, 913, 919, and 925 are also changed to the values of the offsets written in the offset list 613.

As described above, even in the embodiment where the byte length longer than the actual maximum length is used according to unit of memory management, the compiler may decide the operand of the instruction for calculating the start address of the string literal at the time of compilation.

In the meantime, the sequence of languages that the string literals are defined in the locale resource file 502 of FIG. 6 is that the English language (which corresponds to "en-us") is defined firstly, the Chinese language (which corresponds to "zh-cn") is defined secondly, and the Japanese language (which corresponds to "ja") is defined thirdly. However, a developer may adopt an arbitrary other sequence. For example, the sequence of languages that the first defined language is the Japanese language, the second defined language is the English language, and the third defined language is the Chinese language may be adopted.

Further, the string literals that correspond to three languages are defined in the locale resource file 502. However, the number of languages that the string literals are defined in the locale resource file 502 may be an arbitrary number which is 2 or more.

In the meantime, the language which is used in the locale of the execution environment may not identical with any language among the languages that the string literals are defined in the locale resource file 502. In this case, the default language is selected at the time of execution among the languages that the string literals are defined in the locale resource file 502. For example, the default language in the second embodiment is the English language as described above.

When the string literal of the English language is defined in the locale resource file 502, the object code generation unit 607 of the second embodiment automatically determines the English language as the default language. The instruction 822 of FIG. 10 is an example of an instruction which is generated based on the determination.

However, the string literal of the English language is not always defined in the locale resource file 502. Depending on the embodiment, the compiler 500 (especially, the object code generation unit 607) may determine the default language according to a suitable method. Four methods are described in the following.

According to the first method, the object code generation unit 607 checks "whether the string literal of the English language is defined in the locale resource file 502". When the string literal of the English language is defined in the locale resource file 502, the object code generation unit 607 automatically determines the English language as the default language.

In contrast, when the string literal of the English language is not defined in the locale resource file 502, the object code generation unit 607 may inquire of a user about the default language in an interactive manner in the course of the compilation process. Further, here, the "user" is a developer who instructs the compiler 500 to compile the source file 501.

There may be a case where the string literals for two or more locales that use the English language (e.g., two locales identified by names of "en-us" and "en-gb") may be separately defined in the locale resource file 502. In this case, the object code generation unit 607 may automatically select the English language used in one of these two locales as the default language.

According to the second method, the default language is explicitly designated by the command option that calls the program of the compiler 500. For example, the locale resource file 502 of FIG. 6 may be given to the compiler 500 as an input and also the locale name of "zh-cn" may be designated by the user by the command option. In this case, the object code generation unit 607 generates an instruction of "Mov Reg2, 1" (e.g., an instruction which is the same as the instruction 814) instead of the instruction 822 of FIG. 10, according to the designated command option. Further, here, the "user" is also the developer who instructs the compiler 500 to compile the source file 501.

According to the third method, the default language is designated by the format of the locale resource file 502. The user prepares the locale resource file 502 in a suitable format according to his intention to designate which language as the default language. Here, the "user" is also the application developer.

For example, the object code generation unit 607 may regard the language which is designated first in the header row of the locale resource file 502 as the default language. For example, the locale name of the "en-us" is designated first in the locale resource file 502 of FIG. 6. Accordingly, the object code generation unit 607 recognizes that "the designated default language is the English language" and generates the instruction 822 similarly as in the second embodiment.

In contrast, the object code generation unit 607 may regard the language which is designated last in the header row of the locale resource file 502 as the default language. In this case, the object code generation unit 607 may generate an instruction of "Mov Reg2, 2" (e.g., an instruction which is the same as the instruction 819) instead of the instruction 822 of FIG. 10. Otherwise, in this case, the object code generation unit 607 may simply omit generation of the instruction 817, the instruction 818, the instruction 820, the label 821, and the instruction 822 of FIG. 10.

The fourth method is a method in which the default language is not determined using a single option at the time of compilation. In the fourth method, the object code generation unit 607 may generate the sequence of instructions containing the instruction as follows, instead of the instruction 822.

Several instructions for displaying GUI (Graphical User Interface) widget (e.g., a drop down list) in order for the user to select one of the plurality of languages designated in the header row of the locale resource file 502. Further, here, the "user" is an end user who uses the executable file 507.

Several instructions for setting the suitable value in the register Reg2 based on the value input through the GUI widget. Further, the conditional branch instruction is contained among these instructions.

According to the fourth method, when the language used in the locale of the execution environment is not identical with any one of the languages that the string literals are defined in the locale resource file 502, the default language is designated by the user through the GUI widget at the time of execution. Further, also in the fourth method, the sequence of instructions itself generated by the object code generation unit 607 is decided at the time of compilation.

As described above, although descriptions have been made on various embodiments, the following effects may be achieved by all the embodiments.

According to various embodiments described above, the resource file is not needed to be referenced at the time of execution, differently from the first comparative example of FIG. 2. Accordingly the executable file and the plurality of resource files are not needed to be distributed to the end user by being combined as a set.

For example, it is possible to be adapted to a plurality of cultural regions (e.g., a plurality of locales) by using only a single file such as the executable file 507 of the FIG. 7. That is, it is possible to be adapted to a plurality of languages by using only a single executable file.

When it is unnecessary to refer to the resource file at the time of execution, an overhead of a call through the resource call DLL 202 may be removed. As a result, an execution performance of application is improved. Further, when it is unnecessary to refer to the resource file at the time of execution, a management cost for preventing the end user from erroneously deleting, editing and/or moving the resource file is not needed.

Further, according to various embodiments described above, as in the second comparative example of FIG. 3 and FIG. 4, it is also unnecessary to perform the processing that "a plurality of source files are generated according to the plurality of locales and respective source files are compiled to build the plurality of executable files". According to various embodiments described above, the executable file (e.g., the executable file 507 of FIG. 7) adaptable to the plurality of locales may be prepared by one time build. Accordingly, the cost of development and maintenance in various embodiments described above is lower than that in the second comparative example.

Further, the operand is not able to be decided at the time of compilation so that the compilation fails in the third comparative example, but such a failure does not occur in various embodiments described above. This is because the same length is allocated to a plurality of string literals that belong to the same literal tuple. Therefore, in various embodiments described above, it is possible to compute the start address of any one of the string literals that belong to the same literal tuple using the common offset which is irrelevant to the locale in execution and thus, the operand may be decided at the time of compilation.

For example, as illustrated in FIG. 6, the plurality of string literals themselves that belong to the same literal tuple are different from each other in length. However, when the same length is allocated to the plurality of string literals, the start address of each string literal is decided at the time of compilation. That is, the operand is uniquely decided at the time of compilation. Accordingly, the failure as in the third comparative example may be avoided.

As described above, various embodiments described above have various effects that are advantageous for promoting multilingualization of the application. Accordingly, it is expected that various embodiments described above may contribute to promote the multilingualization of the application.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A compile apparatus, comprising:
   a memory; and
   a processor coupled to the memory and configured to execute a compilation process, the compilation process includes:
   reading a source code to be compiled and literal tuples each of which is a combination of a plurality of string literals having meanings that correspond to each other between a plurality of languages, and
   generating a code in which regarding each literal tuple, a calculation byte length which is greater than or equal to a longest byte length of the string literal among the literal tuple is allocated to each of the plurality of string literals that belong to the literal tuple and a start address of each string literal is referenced according to a locale designated at an execution time.

2. The compile apparatus according to claim 1, wherein the generating the code includes;
   generating a plurality of instructions which contains one or more instructions for acquiring a locale identification information indicating the locale, one or more instructions for a conditional branch according to the locale identification information, and one or more instructions for referring to the start address of each string literal using a plurality of numeric values that correspond to the plurality of languages, and
   inserting the plurality of instructions in the code.

3. The compile apparatus according to claim 2, wherein in the code generated at the generating, the string literal is placed for each language and with respect to each language, a plurality of string literals of the language are placed in the order in which the plurality of string literals are defined between a plurality of literal tuples.

4. The compile apparatus according to claim 3, wherein the compilation process further includes calculating an offset which corresponds to each literal tuple by cumulatively adding the calculation byte length, and the one or more instructions for referring to the start address of each string literal contains an instruction in which an operand containing the offset is designated.

5. The compile apparatus according to claim 4, wherein the compilation process further includes calculating a total of the calculation byte lengths of all the literal tuples, and
   the one or more instructions for referring to the start address of each string literal includes an instruction for calculating the start address of a range in which a plurality of string literals of one language, which corresponds to the locale among the plurality of languages, are placed based on the total of the calculation byte lengths.

6. The compile apparatus according to claim 3, wherein the source code contains the string literal or a reference to the string literal with respect to each of the plurality of string literals written in one language among the plurality of languages, and
   the order in which the plurality of string literals are defined between the literal tuples is based on an order in which the string literal written in one language or the reference to the string literal written in one language appears in the source code.

7. The compile apparatus according to claim 2, wherein in the code generated in the generating, the string literal is placed for each literal tuple and with respect to the literal tuple, the plurality of string literals that belong to the literal tuple are placed in the order in which the plurality of string literals are defined between the plurality of languages.

8. The compile apparatus according to claim 7, wherein the compilation process includes calculating a first value which corresponds to each literal tuple by cumulatively adding the calculation byte length, and the one or more instructions for referring to the start address of each string literal contains an instruction in which an operand containing a second value, which is determined according to the number of plurality of languages and the first value, is designated.

9. The compile apparatus according to claim 2, wherein specific natural languages are used in a first locale and a second locale, two of the plurality of languages are the specific natural language used in the first locale and the specific natural language used in the second locale, and
   an instruction for calculating the start address by using the first numeric value of the plurality of numeric values in a case where the locale identification information indicates the first locale and for calculating the start address by using the second numeric value of the plurality of numeric values in a case where the locale identification information indicates the second locale, is contained in the plurality of instructions.

10. The compile apparatus according to claim 2, wherein
specific natural languages are used in the first locale and the second locale,
one of the plurality of languages is the specific natural language which is common between the first locale and the second locale, and
an instruction for calculating the start address by using any one of the plurality of numeric values even in any one of a case where the locale identification information indicates the first locale and a case where the locale identification information indicates the second locale, is contained in the plurality of instructions.

11. The compile apparatus according to claim 2, wherein
the compilation process includes determining one of the plurality of languages as a default language, which is used in a case where the language used in the locale which is designated at the execution time is different from any one of the plurality of languages, and
an instruction for calculating the start address using a numeric value which correspond to the default language among the plurality of numeric values in a case where the locale identification information indicates the locale which uses a language different from any one of the plurality of languages, is contained in the plurality of instructions.

12. The compile apparatus according to claim 1, wherein
the generating the code includes, with respect to each literal tuple, padding each string literal, which has a length less than the calculation byte length among the plurality of string literals that belong to the literal tuple, with a predetermined character and placing the string literal padded with the predetermined character in the code.

13. The compile apparatus according to claim 1, wherein the generating the code includes:
embedding the numeric value which indicates the length of each of the plurality of string literals that belong to each literal tuple in the code, and
generating an instruction for referring to an address in which the numeric value indicating the length is embedded.

14. The compile apparatus according to claim 1, wherein
the generating the code includes inserting a language independent string literal in the code when the source code contain the language independent string literal which is used commonly regardless of the locale or contain a reference to the language independent string literal.

15. The compile apparatus according to claim 1, wherein
the calculation byte length corresponding to each literal tuple is the longest byte length of the string literal among the plurality of string literals that belong to the literal tuple.

16. The compile apparatus according to claim 1, wherein
the calculation byte length corresponding to each literal tuple is a minimum byte length which satisfies a condition that the minimum byte length is a multiple of a predetermined byte length which is unit of memory management and is greater than or equal to the longest byte length of the string literal among the plurality of string literals that belong to the literal tuple.

17. The compile apparatus according to claim 1, wherein the locale defines a language in an operating system in an execution environment.

18. A compile method, comprising:
reading, by a computer, a source code to be compiled and literal tuples each of which is a combination of a plurality of string literals having meanings that correspond to each other between a plurality of languages, and
generating, by the computer, a code in which regarding each literal tuple, a calculation byte length which is greater than or equal to a longest byte length of the string literal among the literal tuple is allocated to each of the plurality of string literals that belong to the literal tuple and a start address of each string literal is referenced according to a locale designated at an execution time.

19. The compile method according to claim 18, wherein the locale defines a language in an operating system in an execution environment.

20. A non-transitory, computer-readable recording medium having stored therein a program for causing a computer to execute a process, the process comprising:
reading, by the computer, a source code to be compiled and literal tuples each of which is a combination of a plurality of string literals having meanings that correspond to each other between a plurality of languages, and
generating, by the computer, a code in which regarding each literal tuple, a calculation byte length which is greater than or equal to a longest byte length of the string literal among the literal tuple is allocated to each of the plurality of string literals that belong to the literal tuple and a start address of each string literal is referenced according to a locale designated at an execution time.

21. The non-transitory, computer-readable recording medium according to claim 20, wherein the locale defines a language in an operating system in an execution environment.

* * * * *